(12) United States Patent
Stiffler et al.

(10) Patent No.: US 6,622,263 B1
(45) Date of Patent: Sep. 16, 2003

(54) METHOD AND APPARATUS FOR ACHIEVING SYSTEM-DIRECTED CHECKPOINTING WITHOUT SPECIALIZED HARDWARE ASSISTANCE

(76) Inventors: Jack Justin Stiffler, 286 Delano Rd., Marion, MA (US) 02738; Donald Burn, 58 Flanders Rd., Westborough, MA (US) 01581

( * ) Notice: Subject to any disclaimer, the term of this patent is extended or adjusted under 35 U.S.C. 154(b) by 586 days.

(21) Appl. No.: 09/608,520

(22) Filed: Jun. 30, 2000

Related U.S. Application Data
(60) Provisional application No. 60/142,080, filed on Jun. 30, 1999.

(51) Int. Cl.[7] .................................................. G06F 11/00
(52) U.S. Cl. ......................................... 714/13; 711/135
(58) Field of Search ............................... 714/13, 15, 16, 714/17, 20, 27, 47; 711/133, 135, 159

(56) References Cited

U.S. PATENT DOCUMENTS

| | | | |
|---|---|---|---|
| 5,235,700 A | | 8/1993 | Alaiwan et al. |
| 5,724,581 A | * | 3/1998 | Kozakura ................... 707/202 |
| 5,737,514 A | * | 4/1998 | Stiffler .......................... 714/13 |
| 5,745,672 A | * | 4/1998 | Stiffler ........................... 714/6 |
| 5,751,939 A | * | 5/1998 | Stiffler .......................... 714/15 |
| 5,787,243 A | | 7/1998 | Stiffler |
| 5,832,202 A | * | 11/1998 | Slavenburg et al. .......... 714/16 |
| 5,864,657 A | | 1/1999 | Stiffler |
| 5,864,849 A | * | 1/1999 | Bohannon et al. ............. 707/8 |
| 5,958,070 A | | 9/1999 | Stiffler |
| 6,161,219 A | * | 12/2000 | Ramkumar et al. ......... 717/130 |

\* cited by examiner

*Primary Examiner*—Nadeem Iqbal
(74) *Attorney, Agent, or Firm*—Kudirka & Jobse, LLP

(57) ABSTRACT

System-directed checkpointing is accomplished following each checkpoint by mapping all memory pages, including read-only pages and read/write pages as read-only pages. Therefore, when an attempt is made to write to a page, a page-fault interrupt is generated. If the page is a read-only page, then normal page-fault interrupt protocol is followed. If the page is a read/write page that has temporarily been labeled read-only, the page is copied to a buffer and the memory map is changed to indicate that the page is now a read/write page. The pages in the buffer can then be used to restore the system after a fault. In accordance with another embodiment of the invention, after the aforementioned system interrupt occurs, the identity of the page is recorded in a backup computer, but the page itself is not copied. In addition, the locations of all pages modified through I/O events are also recorded. At the time of a checkpoint, the checkpoint software copies the contents of all modified pages to a memory in the backup computer. The backup computer can then be used to restart the system after a fault. This latter technique can also be used in a clustered environment with one computer effectively serving as a backup for every other computer in the cluster.

31 Claims, 13 Drawing Sheets

METHOD AND APPARATUS FOR ACHIEVING SYSTEM-DIRECTED CHECKPOINTING WITHOUT SPECIALIZED HARDWARE ASSISTANCE

RELATED APPLICATIONS

This application is related to, and claims priority of, U.S. provisional application Ser. No. 60/142,080, filed on Jun. 30, 1999, by Jack J. Stiffler and Donald Burn.

FIELD OF THE INVENTION

This invention relates to apparatus and techniques for achieving fault tolerance in computer systems and, more particularly, to techniques and apparatus for establishing and recording a consistent system state from which all running applications can be safely resumed following a fault.

BACKGROUND OF THE INVENTION

"Checkpointing" has long been used as a method for achieving fault tolerance in computer systems. It is a procedure for establishing and recording a consistent system state from which all running applications can be safely resumed following a fault. In particular, in order to checkpoint a system, the complete state of the system, that is, the contents of all processor registers, cache memories, and main memory at a specific instance in time, is periodically recorded to form a series of checkpointed states. When a fault is detected, the system, possibly after first diagnosing the cause of the fault and circumventing any malfunctioning component, is returned to the last checkpointed state by restoring the contents of all registers, caches and main memory from the values stored during the last checkpoint. The system then resumes normal operation. If inputs and outputs (I/Os) to and from the computer are correctly handled, and if, in particular, the communication protocols being supported provide appropriate protection against momentary interruptions, this resumption from the last checkpointed state can be effected with no loss of data or program continuity. In most cases, the resumption is completely transparently to users of the computer.

Checkpointing has been accomplished in commercial computers at two different levels. Early checkpoint-based fault-tolerant computers relied on application-directed checkpointing. In this technique, one or more backup computers were designated for each running application. The application was then designed, or modified, to send periodically to its backup computer, all state information that would be needed to resume the application should the computer on which it was currently running fail in some way before the application was able to establish the next checkpoint.

This type of checkpointing could be accomplished without any specialized hardware, but required that all recoverable applications be specially designed to support this feature, since most applications would normally not write the appropriate information to a backup computer. This special design placed a severe burden on the application programmer not only to ensure that checkpoints were regularly established, but also to recognize what information had to be sent to the backup computer. Therefore, in general, application-directed checkpointing has been used only for those programs that have been deemed especially critical and therefore worth the significantly greater effort required to program them to support checkpointing.

System-directed checkpointing has also been implemented in commercial computer systems. The term "system-directed" refers to the fact that checkpointing is accomplished entirely at the system software level and applications do not have to be modified in any way to take advantage of the fault-recovery capability offered through checkpointing. System-directed checkpointing has the distinct advantage of alleviating the application programmer from all responsibility for establishing checkpoints. Unfortunately, its implementation has been accomplished through the use of specialized hardware and software, making it virtually impossible for such systems to remain competitive in an era of rapidly advancing state-of-the-art commodity computers.

More recently, techniques have been disclosed for achieving system-directed checkpointing on standard computer platforms. These techniques, however, all require specialized plug-in hardware components. These plug-in components intercept either all reads from memory, or all writes to memory, so that the information needed to establish a checkpoint is made available to the checkpointing software. This procedure suffers from two major disadvantages: first, the intercepting hardware introduces additional delays in the processor-to-memory path, making it difficult to meet the very tight timing requirements for memory access in state-of-the-art computers. Second, new hardware has to be developed for each set of memory-control chips used in systems that are to be endowed with this capability. Since new memory-control chip sets are developed with high frequency in the rapidly evolving computer industry, it is costly to make this capability available on a continuing basis.

SUMMARY OF THE INVENTION

In accordance with one illustrative embodiment of the invention, a memory map that is normally used to convert virtual memory addresses into physical memory addresses is also used to guarantee that an image of each data page to be modified is captured before that modification occurs. In particular, following each checkpoint, all pages, including read-only pages and read/write pages are mapped as read-only pages. Therefore, when an attempt is made to write to a page, a system interrupt is generated. If the page is a read-only page, then normal page-fault interrupt protocol is followed. If the page is a read/write page that has temporarily been labeled read-only, the page is copied to a buffer and the memory map is changed to indicate that the page is now a read/write page. Normal processing then resumes.

In accordance with another embodiment of the invention, after the aforementioned system interrupt occurs, the identity of the page is recorded, but the page itself is not copied. In addition, the locations of all pages modified through I/O events are also recorded. At the time of a checkpoint, the checkpoint software copies the contents of all modified pages to the secondary computer. The primary computer halts all further processing until all pages have been thus copied at which time the checkpoint is committed and normal processing resumes.

In accordance with yet another embodiment, a secondary computer is used as described in the previous embodiment, but instead of halting the primary computer during page copying, normal processing is resumed as soon as all caches have been flushed and the modified pages are copied as a background task.

In still another embodiment of the invention, the write-buffering technique used for local and remote checkpointing can also be used in a clustered environment with one computer effectively serving as a backup for every other computer in the cluster. The aforementioned method and apparatus enable checkpointing techniques to be realized using standard hardware platforms running standard operating systems. As a consequence, otherwise standard computers can be endowed with a significant level of fault tolerance without requiring the major hardware and software modifications normally associated with fault-tolerant computers. All applications receive the benefit of fault tolerance without having to be modified in any way.

BRIEF DESCRIPTION OF THE DRAWINGS

The above and further advantages of the invention may be better understood by referring to the following description in conjunction with the accompanying drawings in which.

DETAILED DESCRIPTION

Several embodiments of the invention are described. The first is referred to as "local checkpointing" since, in this case, the checkpointing information is stored in the computer being protected. Obviously, recovery is possible in such a case only if the computer does not sustain a fault that prevents it from running correctly without having to be repaired. However, since typically 90% of hardware faults in a computer are transients, and since a comparable fraction of software bugs also appear as transient events, the ability to recover from such faults through checkpointing vastly increases a computer's reliability and availability.

If it is desired to recover from permanent, as well as transient, hardware faults, a second option is for a computer to checkpoint its state to another computer. This backup computer may be idle, ready to take over in case the active computer fails, or it may be active. In the latter case, the operating system either must merge the two sets of tasks running on the two computers should one of them fail, or else drop one set of tasks and pick up the presumably more critical tasks that were running on the failed computer. In either event, this option will be referred to as "remote checkpointing." Remote checkpointing, in addition to providing a means for recovering from permanent as well as transient faults, also adds another level of fault detection. Any fault that prevents a computer from communicating correctly with its backup can be detected by that backup and is used as one of the signals to begin fault recovery.

Since the checkpointing and fault recovery software runs on otherwise standard platforms, the faults that are detected are those that cause an observable malfunction. Since most standard platforms today implement a number of hardware fault detection mechanisms (such as parity on data stored in memory and passed across buses, out-of-range address detectors and illegal op-code detectors) and since most operating systems implement executable assertions that recognize when software is attempting some illegitimate activity (for example, exceeding the allocated range defined for a given data structure), a large fraction of hardware and software errors produce detectable events. However, standard computers are unable to recover from those events because data is corrupted or program continuity is lost as a result of the error and the computer typically crashes and has to be rebooted, often with a significant loss of data. Checkpointing, in accordance with the present invention, provides a means for recovering without either data corruption or loss of program continuity and for doing so typically in well under one second.

1) Local Checkpointing

Figure 1:
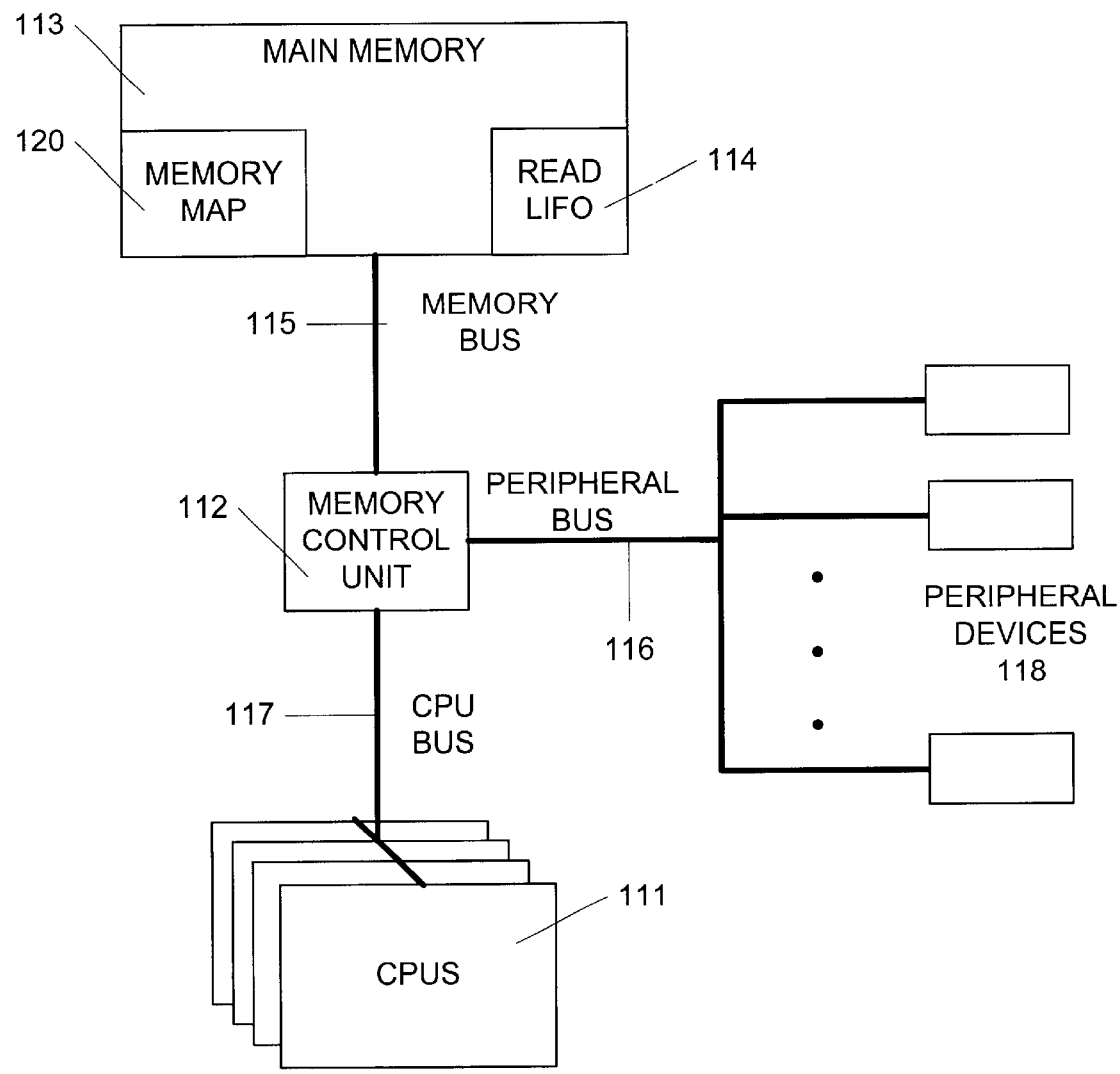
FIG. 1 is a block schematic diagram of a computer system which contains a read buffer used by the present invention for local checkpointing.

FIG. 1 illustrates a generic computer architecture. The central processing unit (CPU) 111 is typically composed of one or more processors along with their associated registers, cache memories and boot read-only memories (ROMs) (not shown). The CPU is connected to a memory control unit 112 via a processor bus 117. The memory control unit 112 connects the processor bus 117 to the memory bus 115 and the peripheral bus 116 and provides the control logic needed to communicate over those buses and to access main memory 113 and the peripheral devices 118 that typically include disk and tape storage units and communications controllers.

The present disclosure entails no special hardware or other physical modification to this generic architecture. It does require a small segment of memory to be partitioned off and used as a read-buffer. This memory may be configured as a last-in-first-out (LIFO) buffer memory 114, but could also have other memory configurations . All operations needed to manage this buffer are implemented in software. The invention also uses the conventional memory map 120, but modifies its operation as discussed in detail below.

In particular, in accordance with one aspect of the invention, the memory map 120 is used to guarantee that a pre-image of each data page is captured before that data page is allowed to be modified. All standard computer systems make use of a memory map, such as map 120, to convert virtual addresses used by applications and by the operating system itself into physical addresses that point to specific locations in main memory 113. In a conventional memory map, each memory-map entry, in addition to containing the virtual-to-physical-address translation information, contains other information as well. In particular, this other information includes write permission information that indicates whether the page in question is a read-only page or whether it can be written as well as read.

In accordance with the present invention, following each checkpoint, the write permission information in the memory map entries is modified so that each page, with the exceptions discussed in the next paragraph, is mapped to appear as a read-only page. In particular, each read/write page is designated with a special temp-read-only permission so that it temporarily appears as a read-only page. When an attempt is made to write to a page thus mapped, a system interrupt is generated. In response to such an interrupt, the system, in accordance with the principles of the present invention, determines if the page is a strictly read-only page or if it is a read/write page that has temporarily been labeled as read-only for checkpointing purposes. In the former case, normal page-fault interrupt protocol is followed. In the latter case, the page is copied to the read LIFO buffer 114 and the memory map entry for that page is changed to indicate that the page is now a read/write page. Following that, normal processing resumes.

Figure 2:
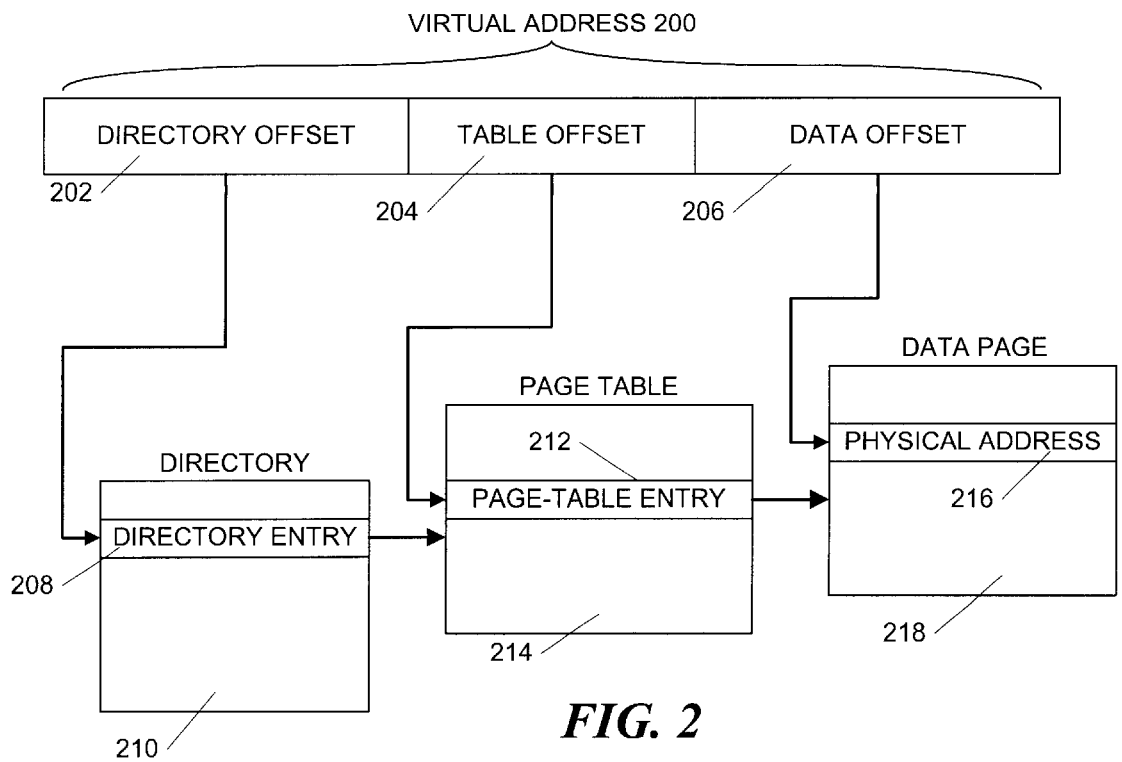
FIG. 2 is a schematic diagram of a memory map illustrating the paged, hierarchical construction.

Some processors are unable to handle a second page fault while responding to a previous page fault. In systems utilizing these processors, the page-fault handler software is modified to check the memory map, before each write to memory, to determine if the write is destined for a page that has not been written to since the last checkpoint. If it is, the pre-image of that page is buffered in the read LIFO 114 and the state of that page in the memory map is changed to read/write before being referenced. Since this state change operation could itself potentially cause a page fault, the structure of conventional memory maps is first exploited to avoid this possibility. Standard memory maps are organized into a hierarchy of tables, as shown in FIG. 2, with the tables at each level containing the maps, including the write permissions, for pages at the next level.

To convert a virtual address 200 into the physical address of the desired item 231, the virtual address 200 is typically partitioned into blocks, 202, 204 and 206. The first block 202 defines an offset in a directory 210, the address of which is a function of the particular program being executed. This offset identifies a directory entry 208 which, in turn, contains the physical address of the relevant page table 214. The second block 204 of the virtual address 200 then determines the offset within the page table 214 of a page table entry 212 that contains the physical address of the data page 218 itself. The third virtual address block 206 determines the offset within the page where the item of interest 216 can be found.

Thus, to avoid the possibility that a page table update can itself cause a page fault, the procedure for writing to memory during a page-fault interrupt service is as follows: First write permission information in the directory entry 208 is checked to determine if the page table 214 is currently listed as temp-read-only. If it is, the pre-image of the page table is buffered in the read LIFO 114 and the permission information in the directory entry 208 is changed to read/write. The data page 218 is then also copied to the read LIFO 114 and the write permission information in the page-table entry 212 is also changed to read/write. Only then is a write to the data page 218 allowed to take place. The write permissions in the directories themselves, such as directory 210, are always left in the read/write state. Each directory, such as directory 210, is copied to the read LIFO 114 the first time a program using the directory is invoked following a checkpoint.

In addition, several changes must be made concerning I/O reads and writes. For example, I/O driver software (the software used to communicate with the peripheral devices 118) is modified to ensure that no I/O read (i.e., a write from an I/O device to a memory page) following a checkpoint destroys data that was part of that checkpoint. Normally, a buffer memory is assigned by the operating system to an I/O driver for its use when the driver is activated or called. Since the buffer assigned to an I/O driver is considered by the system to be of indeterminate state from the time the driver is called until it exits, large I/O reads are handled by ensuring that a checkpoint occurs after the buffer assignment, but before the driver software begins to use the buffer. For smaller I/O reads, pre-images of the assigned buffers are copied to the checkpoint buffer area 114 prior to calling the I/O driver.

I/O writes (reads from memory) are also handled in the inventive system differently than in conventional system-directed checkpointing schemes. In those prior art systems, idempotent (e.g., disk) outputs that occur after a checkpoint are typically blocked and not released until the next checkpoint. This blocking is required because the operation of reading a sector from disk and then writing it back to disk would produce incorrect results if it were repeated. The blocking of disk outputs, however, has the unfortunate side effect of severely reducing disk throughput in systems that are disk-I/O-bound.

In accordance with another aspect of the present invention, a special program maintains a list of all sectors that have been read from disk since the last checkpoint. This list is then scanned by the driver software before any disk write command is allowed to be issued. If the region to be written is on the list, the write command is placed on a queue and not released until the next checkpoint is committed. If the region to be written is not on the list, the write command is allowed to proceed immediately. The latter situation will occur in the vast majority of cases and, thus, disk throughput is greatly increased.

However, paged-memory writes to disk are always blocked until the next checkpoint; otherwise, the system will be vulnerable to destruction of data in the disk paging area. In particular, when a page in memory is written to the disk paging area, its data may overwrite the data of a previously stored memory page that was retrieved from disk during that same checkpoint interval. This data of the previously stored memory page will be needed should the system be forced to rollback. Fortunately, the blocking of paged-memory writes has a negligible performance impact.

In addition, a list of all outstanding events is maintained for non-idempotent I/O writes so that, during a rollback, uncompleted events can be either restarted or dropped, depending on the specific I/O protocol. Those I/O writes that may precipitate irreversible events are placed on a queue and are not physically released until the checkpoint following their issuance. In this way, they do not take place until the state of the machine that is checkpointed is consistent with the released I/O.

Finally, all I/O drivers are additionally modified to ensure that, in the event of a fault, the state of the driver can be restored to the appropriate operating state. These modifications are generally straightforward, entailing the recording of state-change commands received since the last checkpoint, and can usually be implemented with, at most, a few hundred lines of code. With many drivers, in fact, existing facilities can be used to this end, obviating the need for any additional code.

Checkpoints are generally precipitated by a timer. Such a timer may be implemented either by a hardware interrupt or by a periodically scheduled software thread and typically a timeout occurs every 50 milliseconds or so. The timer implementation and the time interval are immaterial to the present disclosure. Other events, in accordance with the present invention, that can also force a checkpoint include: the read LIFO buffer location 114 in main memory 113 becoming filled to a predetermined limit; a process blocked on a pending disk operation; unused I/O capacity due to blocked I/O events (this can occur even when no processes are blocked); and all processors becoming idle and hence unable to do anything else.

In any event, once a checkpoint is initiated, all processors enter checkpointing mode and store the state of their internal registers on the system stack (possibly causing additional page faults with resulting memory-to-memory copies) or in another area of memory reserved for that purpose. As soon as all processors have completed this operation and so indicated that fact, the operating system determines that the checkpoint has been completed (committed), and normal processing resumes.

Any buffered pre-images in the read LIFO buffer memory 114, combined with all other pages in memory that have not been modified and with any cache lines that were modified before the previous checkpoint and not yet reflected back to main memory, constitutes the state of the system at the time of the last checkpoint. In particular, it includes the contents of all cache memories and registers that were current at that time as well as a record of the state of all I/O devices at the time of the last checkpoint. Thus, the system can be restored to the state that existed at the time of the last checkpoint by copying the pre-image pages in the read LIFO buffer 114 back to the appropriate locations in main memory 113 and by resetting the I/O devices to their recorded state. Following a fault, memory is thus restored and the system resumes processing from that restored state.

If no fault occurs before a checkpoint is committed, the contents of the read LIFO buffer 114 are no longer needed. Therefore, the buffer can be reused for storing pages that are to be modified during the next checkpoint interval.

Since the system state resides partially in the processor caches and partially in main memory, any cache line that has been modified during any checkpoint interval but not reflected back to main memory during that same interval becomes part of the checkpointed state at the end of that interval and remains part of each checkpointed state during all subsequent intervals until it associated page is again modified. This is not a problem since normal cache coherency protocols cause the modified portions of any page to be inserted into the pre-image of that page when it is copied to the read LIFO buffer 114 so the correct pre-image is indeed captured when the page is first written to following any subsequent checkpoint. To ensure that all modified cache lines are indeed properly represented in the checkpointed state following a fault, the recovery software first flushes the modified contents of all processor caches back to main memory before restoring it with the buffered pre-images in order to capture the last checkpointed state.

Figure 3:
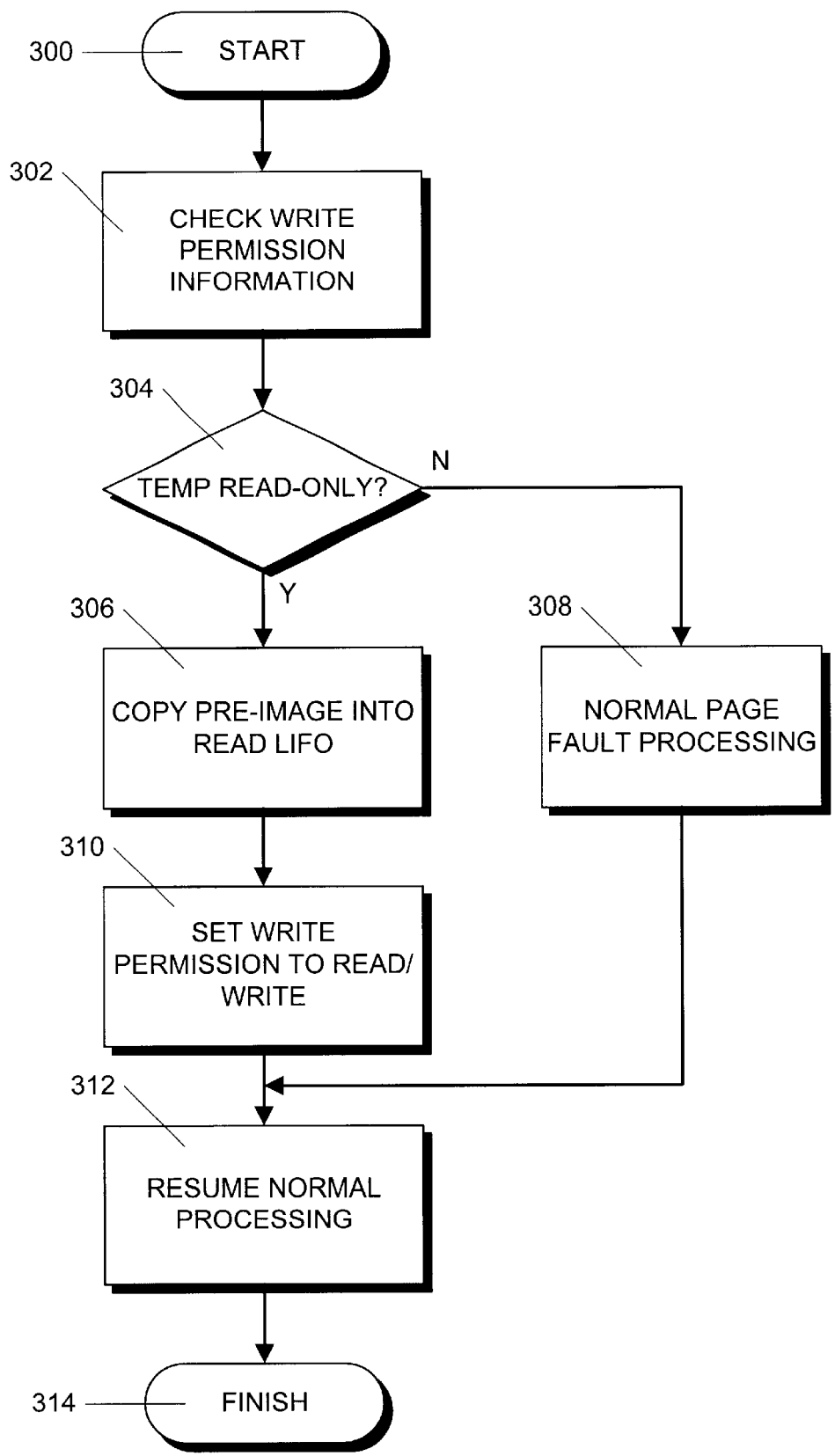
FIG. 3 is a flowchart illustrating a process performed by exception handler software in the embodiment shown in FIG. 1.

In a computer that is protected by local checkpointing, the computer spends the vast majority of its time in its normal operating state, operating exactly as it would were it not being protected through checkpointing. However, the first attempt to write to any page following a checkpoint invokes an exception handler that performs the process whose steps are shown in FIG. 3. This process starts in step 300 and proceeds to is step 302 where the exception handler first checks the write permission for the page to determine whether the exception is due to an attempt to write to a true read-only page or whether it occurred because the attempted write is to a page that has a temp-read-only write permission value. If, in step 304, it is determined that the write permission is true read-only, the process proceeds to step 308 where the exception is treated in the normal way. Normal processing then resumes in step 312 and the exception process terminates in step 314.

Alternatively, if it is determined in step 304 that the exception is due to a write attempt on a page whose write permission is temp-read-only, then, in step 306, the pre-image of that page is copied to the read LIFO buffer 114. In step 310, the write permission information for the page is set to the read/write state. The process then resumes normal operation in step 312 and ends in step 314.

Figure 4:
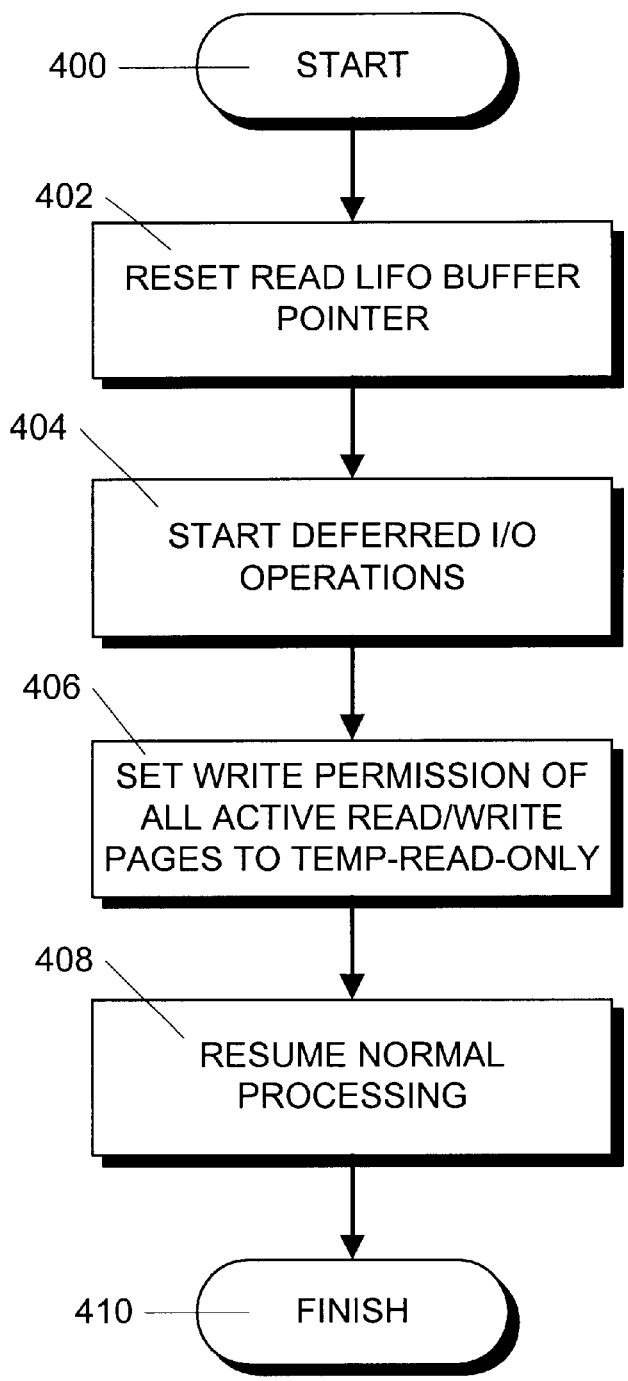
FIG. 4 is a flowchart illustrating a process performed by checkpointing software to perform a checkpoint operation in the embodiment shown in FIG. 1 in accordance with one aspect of the invention.

When a checkpoint is triggered, the computer performs the process in FIG. 4. This process starts in step 400 and proceeds to step 402 where the computer resets a pointer that points to the next available location in the read LIFO buffer 114, effectively clearing the contents of the read LIFO buffer. Next, in step 402, all I/O operations that were deferred awaiting a checkpoint are started. Next, in step 406, the write permission information of all read/write pages in active page tables is set to the temp-read-only state. Normal processing resumes in step 408 and the process ends in step 410. During normal processing, when new tasks are scheduled that have not been previously scheduled during that same checkpoint interval, the read/write permissions of pages associated with those tasks are also all changed to temp-read-only.

Figure 5:
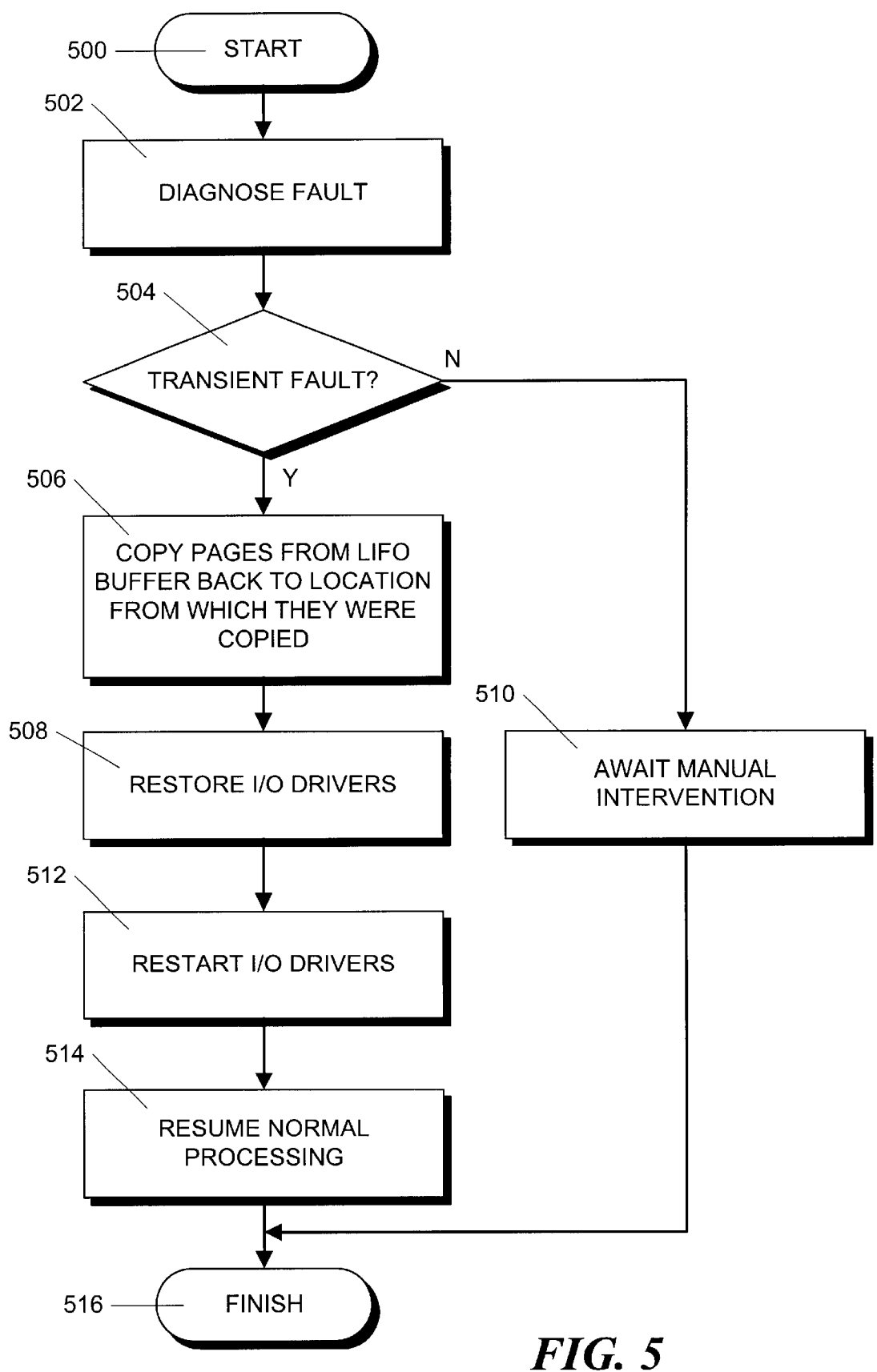
FIG. 5 is a flowchart illustrating a process performed by fault handler software to perform a fault recovery operation in the embodiment shown in FIG. 1 in accordance with one aspect of the invention.

In the event of a detected fault, the recovery software executes the process shown in FIG. 5. This process starts in step 500 and proceeds to step 502 where a diagnostic routine is executed to determine whether the fault was due to a transient event that leaves the computer fully functional or whether the fault is permanent in the sense that the computer cannot continue to operate without repair. If, in step 504, it is determined that the fault is not transient, the process proceeds to step 510 where the computer halts and awaits manual intervention. The process then ends in step 516.

Alternatively, if in step 504, a determination is made that the fault is transient, then the process proceeds to step 506 where the computer memory is restored to its state prior to the last committed checkpoint by copying the pre-images of all the pages that were modified since that checkpoint from the read LIFO buffer 114 back to the location from which they originated. In step 508, the I/O drivers are reset to the states that were then in effect. The computer then restarts normal program execution from the restored state and restarts any I/O operations that were pending at the time of the last committed checkpoint as set forth in step 512 and returns to the normal processing in step 514. The process ends in step 516.

2) Remote Checkpointing

Figure 6:
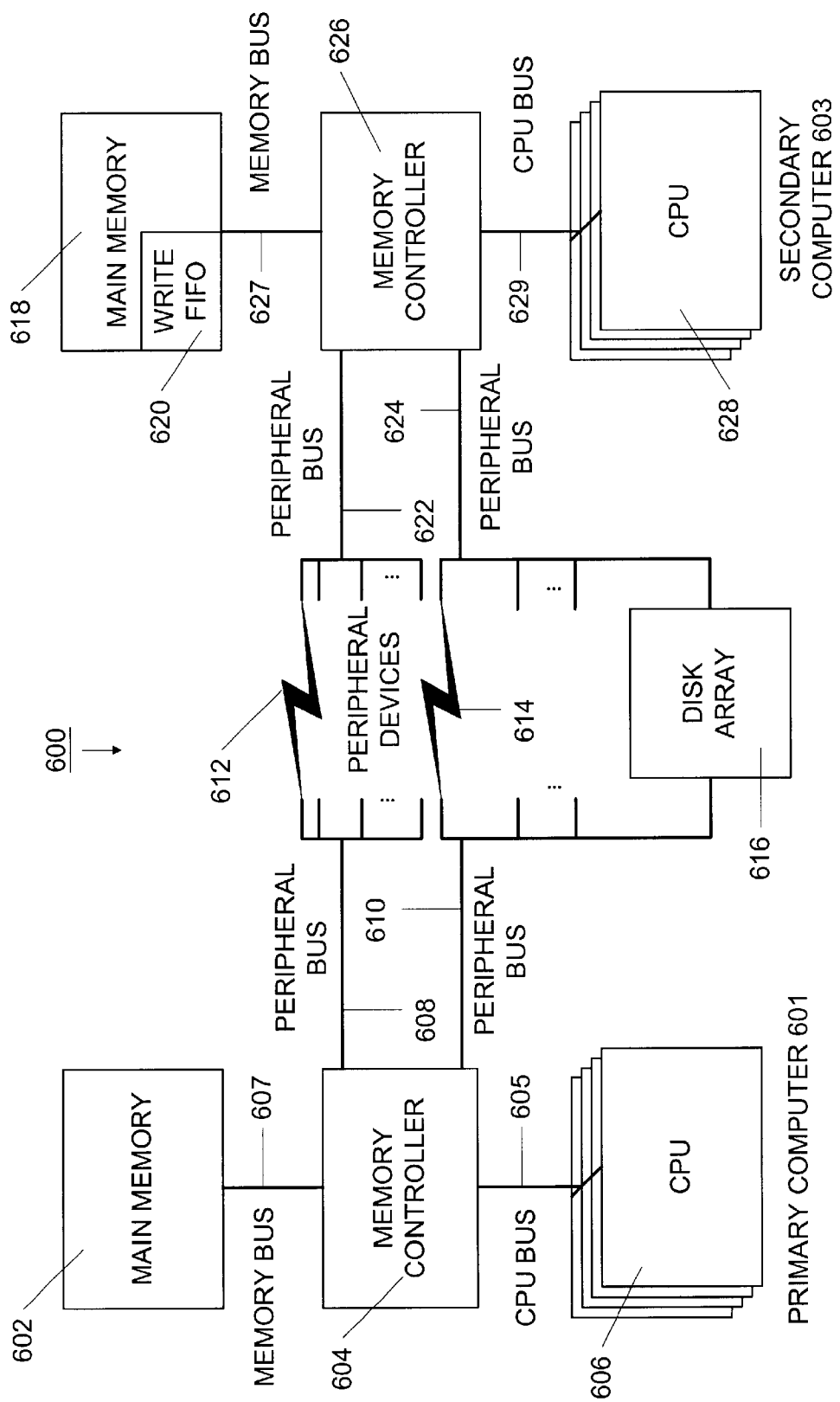
FIG. 6 is a block schematic diagram of a computer system arranged for remote checkpointing in accordance with another embodiment of the present invention.

With remote checkpointing, a second computer (the secondary computer) serves as a backup to the computer being protected (the primary computer). The secondary computer then retains a memory image of the primary computer memory as of its last checkpoint (and hence an image of the state of the primary computer at that instant). An embodiment of a remote checkpointing system is illustrated in FIG. 6. The primary computer 601 and secondary computer 603 are identical implementations of the computer system shown in FIG. 1. In the primary computer 601, the central processing unit (CPU) 606 is typically composed of one or more processors along with their associated registers, cache memories and boot read-only memories (ROMs) (not shown). The CPU 606 is connected to a memory control unit 604 via a processor bus 605. The memory control unit 604 connects the processor bus 605 to the memory bus 607 and to the peripheral busses 608 and 610 and provides the control logic needed to communicate over those buses and to access main memory 602 and peripheral devices (not shown) that typically include disk and tape storage units, communications controllers and storage devices, such as disk array 616.

Similarly, in the secondary computer 603, the central processing unit (CPU) 628 is typically composed of one or more processors along with their associated registers, cache memories and boot read-only memories (ROMs) (not shown). The CPU 628 is connected to a memory control unit 626 via a processor bus 629. The memory control unit 626 connects the processor bus 629 to the memory bus 627 and to the peripheral busses 622 and 624 and provides the control logic needed to communicate over those buses and to access main memory 620 and peripheral devices (not shown) that typically include disk and tape storage units, communications controllers and storage devices, such as disk array 616.

As shown here, both computers 601 and 603 have two peripheral buses 608, 610 and 622, 624, respectively, with two communication links 612 and 614 interconnecting the two computers 601 and 603. While neither two peripheral buses 608, 610 and 622, 624 nor two interconnecting links 612, 614 are essential to the present invention, both add a degree of robustness. It is also not essential that the links 612, 614 connecting the two computers 601, 603 be through standard peripheral buses (608, 622 and 610, 624, respectively.) Some performance improvement could potentially be realized by using communication links specially designed for the purpose, but the embodiment shown in FIG. 6 requires no special-purpose hardware. In any event, one or both of the links 612, 614 are used to send checkpoint data from memory 602 in the primary computer 601 to memory 618 in the secondary computer 603, preferably though the use of standard direct-memory access (DMA) hardware (not shown.)

Storage devices (e.g., disk array 616) must either be duplicated, with all disk stores initiated on the primary computer 601 echoed by the secondary computer 603, or the storage devices must be dual-ported to both computers 601 and 603 as shown for the disk array 616. Maintaining synchronization between separate secondary storage devices on the two computers is relatively straightforward since all the data that is to be stored must necessarily be transferred from the primary computer 601 to the secondary computer 603 during the processing of each checkpoint anyway. It is only necessary for the secondary computer 603 to be able to identify the list of writes that were initiated on the primary computer 601 so that these writes can be replicated on the secondary computer 603. If the two computers 601 and 603 are separated by a large distance, for example, to protect against the loss of data and computational capability due to physical damage to a computer site, this ability to maintain separate, synchronized storage devices is essential.

Other I/O devices that are to be accessed without disruption following a fault must also be either dual ported to both computers 601 and 603 or connected to a communication network (not shown) that is accessible by both computers 601 and 603. On fail over, the secondary computer 603 assumes the MAC identities of the communication ports on the primary computer 601 and responds to the primary computer's IP addresses.

As with local checkpointing, a small portion of memory, in this case the memory portion 620 in the secondary computer 603, is partitioned off to implement the intermediate buffer referred to earlier as a read LIFO buffer 114. Here, however, the buffer 620 is a write-buffer, which is illustratively configured as a first-in, first-out (FIFO) buffer memory (although other memory configurations can be used) used to store temporarily modified pages written from the primary computer 601 to the secondary computer 603.

Should a fault occur in the primary computer 601, the secondary computer 603 detects that event through the absence of continuing checkpointed data and confirms that a fault has indeed taken place by querying the primary computer 601. If two communication links 612, 614 are available and both are used for checkpoint data, the failure to receive data over either link 612, 614 is sufficient cause for the secondary computer 603 to take over. If only one channel, for example 612, ceases transferring data, or if only one channel 612 is used for checkpoint data transfers, the secondary computer 603 queries the primary computer 601 to determine its state over the remaining channel 614. (If only one channel 612 is implemented, the secondary computer 603 takes over on any failure to receive normal communication from the primary computer 601, but some robustness is lost in this case because the failure could be in the channel 612 itself and a successful takeover by the secondary computer 603 in that case is not guaranteed.)

If the query from the secondary computer 603 indicates that the primary computer 601 is in a faulted state, either through a positive response or, more likely, through the absence of a response, the secondary computer 603 takes control of all I/O devices that were dual-ported to both computers (for example disk array 616), resets the I/O state to that that obtained at the last checkpoint and resumes processing from the last completed checkpoint.

Following recovery, the failed computer 601 is taken off-line, diagnosed and repaired. It can then be reintroduced as the backup for the new primary computer 603. To do this, the two computers must be "synchronized;" i.e., the new primary computer 603 copies the entire contents of its main memory 618 to the main memory 602 of the new secondary computer 601. This copying operation is done as a background operation with the primary computer 603 also sending checkpoint data to the secondary computer 601 in parallel. Thus, if a page is copied and subsequently modified, the secondary computer 601 always ends up with the latest copy. This ensures that each checkpoint following the completion of the memory copy leaves the secondary computer 601 with the entire checkpointed state of the primary computer 603, as required. This synchronization procedure is also used in the unlikely event that a sudden burst of data to be checkpointed results in a temporary FIFO-buffer 620 overflow.

Memory modifications due to I/O reads are handled by recording, on exiting the I/O driver, the identity of all memory pages that have been altered as part of the read operation. These pages are then transferred to the secondary computer 603 along with all other pages that have been modified by the CPUs 606. If external storage 616 is shared, as shown in FIG. 6, idempotent and non-idempotent I/O write operations are handled as previously described for local checkpointing. However, since a checkpoint is committed only after all modified pages have been transferred to the secondary computer 603, I/O write operations that are blocked until that event must now wait somewhat longer. If, in contrast, each computer 601, 603 has its own dedicated external storage (not shown) and no external storage is shared, then no writes need to be delayed since the secondary computer 603 does not effect those writes until after the checkpoint is committed, thereby ensuring that its external storage is always in a state consistent with that in its main memory 618.

Figure 7:
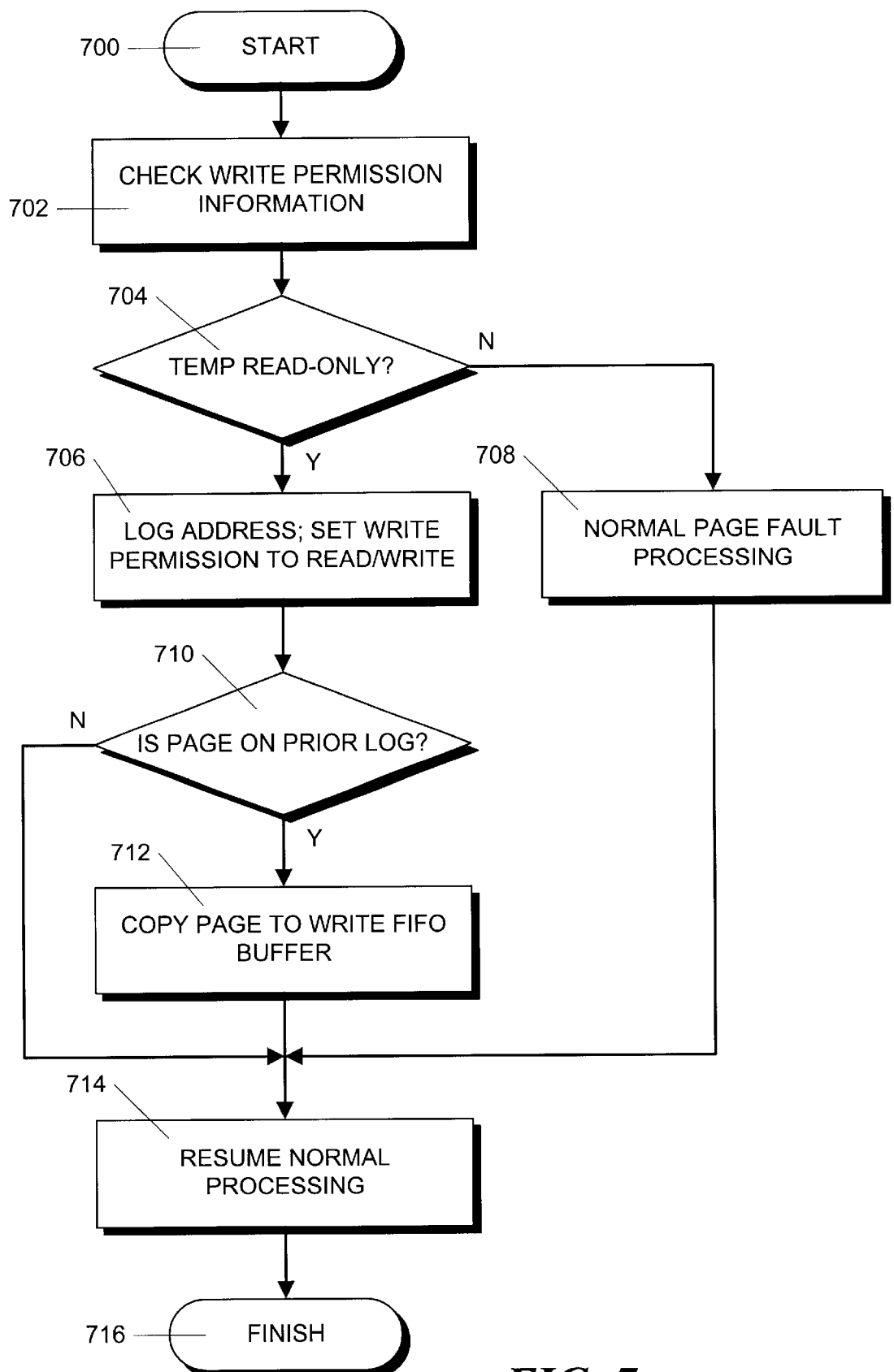
FIG. 7 is a flowchart illustrating a process performed by exception handler software in the embodiment shown in FIG. 6.

To insure that the secondary computer maintains a memory image of the primary computer memory as of its last checkpoint by means of software only, a procedure similar to the procedure illustrated in FIG. 3 is used to ensure that the first write to a memory page following a checkpoint generates a page-fault interrupt. This process is executed by the exception handler and is illustrated in FIG. 7. The process starts in step 700 and proceeds to step 702 in which, following an attempt to write to a page, the exception handler first checks the write permission for the page to determine whether the exception is due to an attempt to write to a true read-only page or whether it occurred because the attempted write is to a page that has a temp-read-only write permission value. If, in step 704, it is determined that the write permission is true read-only, the process proceeds to step 708 where the exception is treated in the normal way. Normal processing then resumes in step 714 and the exception process terminates in step 716.

Alternatively, if it is determined in step 704 that the exception is due to a write attempt on a page whose write permission is temp-read-only, then, in step 706, the identity or address of the page is recorded. In addition, the write permission of the page is changed from temp-read-only to read/write. The locations of all pages modified through I/O events are also recorded.

Next, in step 710, a check is made to determine whether the page is listed on the log of pages yet to be copied (i.e., the log of pages that were recorded during the previous checkpoint interval but have not yet been copied to the secondary computer 603). If it is, the page is first copied to the write FIFO buffer 620 before the process proceeds to step 714. If not, the process proceeds directly to step 714. In either case, in step 714, normal processing resumes and the process ends in step 716.

Figure 8:
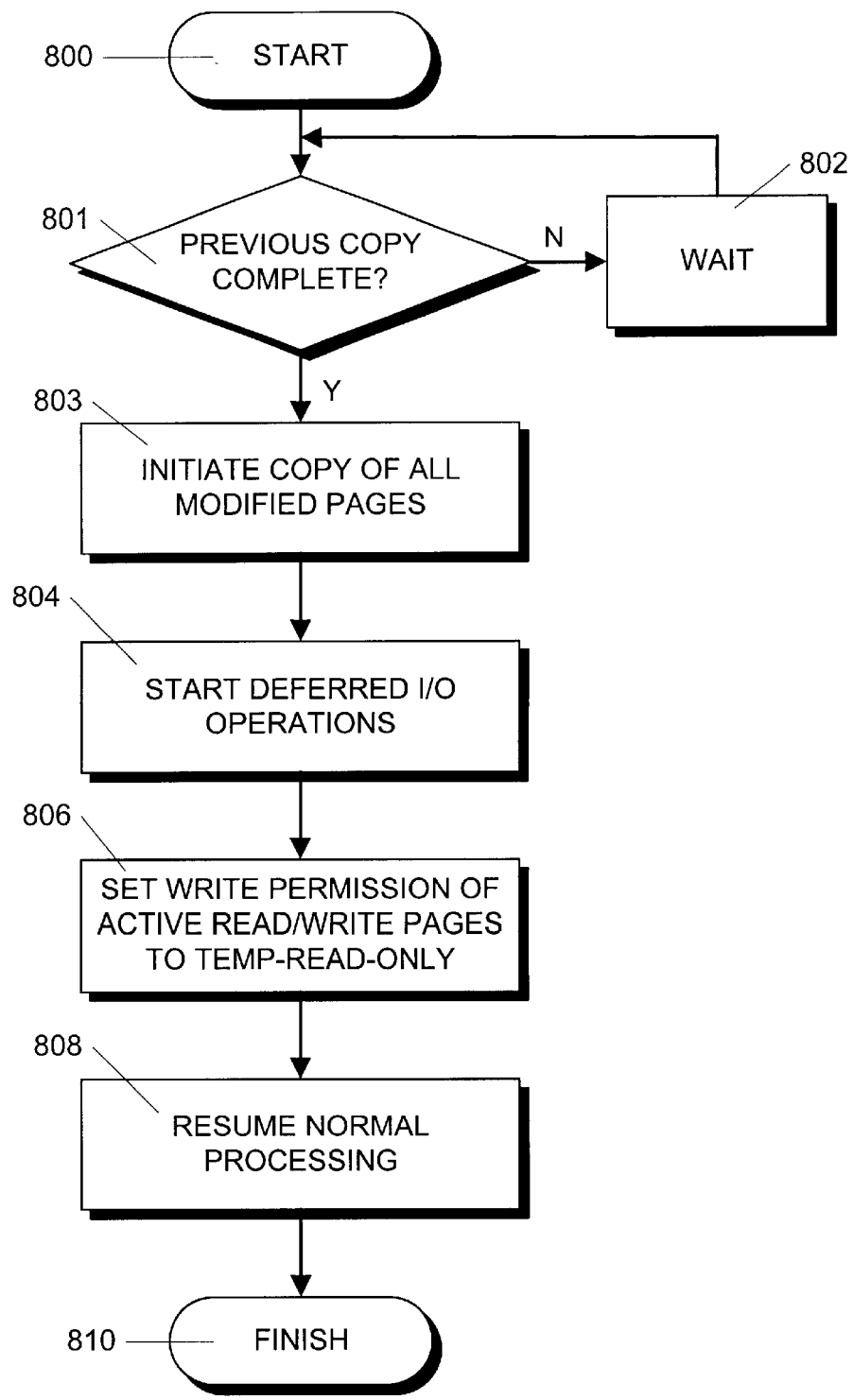
FIG. 8 is a flowchart illustrating a process performed by checkpointing software to perform a checkpoint operation in the embodiment shown in FIG. 6 in accordance with another aspect of the invention.

The checkpoint operation is shown in FIG. 8. This process starts in step 800 and proceeds to step 801 where the process determines if all the pages that were modified prior to the previous checkpoint have been copied to the secondary computer 603. In its simplest embodiment, the primary computer 601 halts all further processing at checkpoint time until all modified pages have been copied. If this is done, then the answer at step 801 is always "yes" and the process transfers immediately to step 803. Waiting for the copy to complete before proceeding with normal processing, however, can consume a significant amount of time, resulting in performance degradation. A more efficient procedure is to allow the copy to be done by a background task while normal processing resumes. If this is done, then, in addition to intercepting the interrupt generated when a page is first modified and recording the identity of that page, the interrupt handler also forces that page to be copied to the secondary computer 603 if it was modified during the previous checkpoint interval and has not yet been copied (i.e., if it is still on the list of pages to be copied as part of the background task).

If the copying of modified pages is done as a background task, the answer at step 801 can be "no", in which case the checkpoint process waits (step 802) until the remaining pages have been copied. In any event, the process proceeds to step 803 where it either copies all of the pages that were modified during the current checkpoint interval, as indicated by the address log, to the secondary computer 603 or, preferably, initiates a background task to do the same thing. Note that the contents of the processors' caches do not need to be flushed out to main memory in either case because normal cache coherency protocols ensure that modified data still residing in any cache also get copied along with the rest of the pages on which it resides.

These pages are copied to an intermediate buffer, such as write FIFO 620, in the secondary computer and then transferred to the correct locations in its main memory only after all modified pages have been transferred to the buffer. (While this intermediate buffer is not strictly necessary, it guarantees that recovery can take place even following faults that prevent the primary computer from completing the copy of a checkpoint to the secondary computer. This is because the checkpoint data is moved to its normal place in main memory only after the entire checkpoint has been transferred. If the fault occurs before that point, the secondary computer's memory still has a consistent copy of the previous checkpoint.) The primary computer 601 signals the secondary computer 603 when the last of the pages associated with a checkpoint have been transferred to it, thereby committing that checkpoint in the secondary computer. The secondary computer then records the value of the pointer that points to is the next available location in the write FIFO buffer 620 so as to be able to distinguish between pages that were modified during the previous, committed checkpoint from those that were modified during the checkpoint just completed and are just beginning to be copied.

The buffer 620 is organized as a circular buffer. A second pointer points to the location of the next location to be copied to the shadow memory. The buffer is full when the number of locations separating the next available location and the next location to be copied falls to zero. The primary computer monitors the number of pages that have been modified during any checkpoint interval. When that number grows to within a specified fraction of the buffer size, it initiates a checkpoint. Since the secondary computer is copying the contents of the buffer to main memory at the same time that it is being copied to by the primary, it is theoretically possible for the buffer to fill even before the number pages modified during any interval equals its capacity if the secondary computer is too slow in copying the pages deposited during the previous checkpoint. In this highly unlikely event, the secondary computer stops accepting inputs from the primary computer unlikely event, the secondary computer stops accepting inputs from the primary computer until space becomes available. The primary computer, upon detecting such an event, temporarily halts, waiting for the secondary to accept new data. If the time during which it is halted exceeds a specified threshold, the primary computer queries the secondary computer to determine if it is still functioning properly. If it is not, the primary computer resumes normal operation without attempting to generate further checkpoints and flags that fact to the system administrator.

Next, in step 802, all I/O operations that were deferred awaiting a checkpoint are started. Next, in step 806, the write permission information of all read/write pages is set to the temp-read-only state. Normal processing resumes in step 808 and the process ends in step 810.

Figure 9:
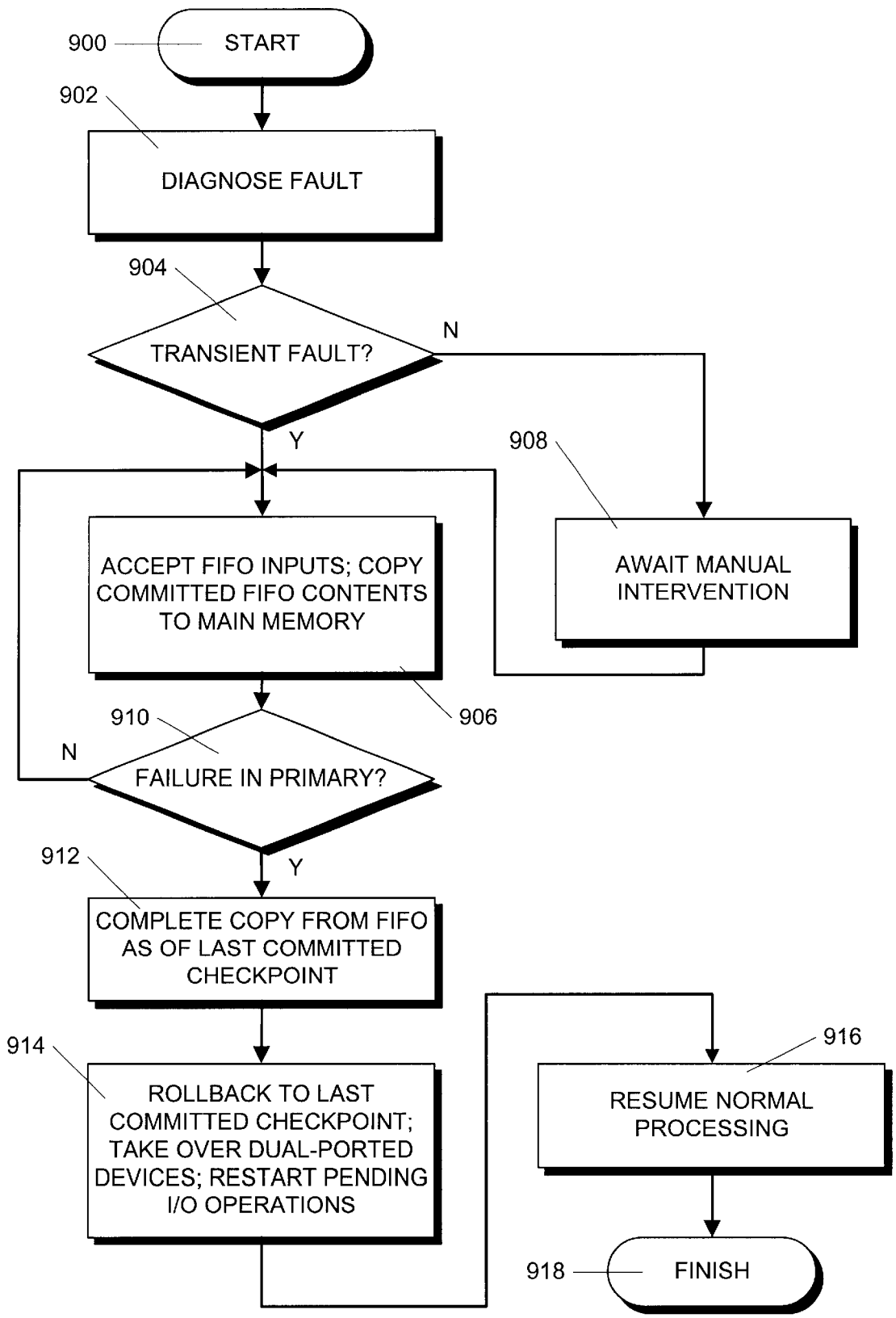
FIG. 9 is a flowchart illustrating a process performed by fault handler software to perform a fault recovery operation in the embodiment shown in FIG. 6 in accordance with another aspect of the invention.

Following a fault, the process illustrated in FIG. 9 is initiated. This process starts in step 900 and proceeds to step 902 where a diagnostic routine is executed to determine whether the fault was due to a transient event that leaves the computer fully functional or whether the fault is permanent in the sense that the computer cannot continue to operate without repair. If, in step 904, it is determined that the fault is not transient, the process proceeds to step 910 where the computer halts and awaits manual intervention. The process then proceeds to step 906.

Alternatively, if in step 904, a determination is made that the fault is transient, then the process proceeds to step 906 where the original primary computer 601 becomes the new secondary computer with the former secondary computer 603 having assumed the primary role following the fault. As the secondary computer, following resynchronization, computer 601 accepts the pages copied to it from the active computer as illustrated in step 906.

The new secondary computer 601 also monitors the checkpoint frequency. If the time between checkpoints exceeds a preset limit, the secondary computer 601 attempts to communicate with the primary computer 603 to determine if it is still operational. If it is, the process proceeds back to step 906 to accept the pages copied by the active computer.

If, in step 910, it is determined that the new primary computer has failed, the process proceeds to step 912 where the new secondary computer 601 completes the transfer of any data in its write FIFO memory that was copied to it as part of the last committed checkpoint. Next, in step 914, the secondary computer 601 takes over all dual-ported I/O devices and restores the associated drivers to the state that obtained at the last checkpoint. It then restarts all I/O operations that were pending at the time of that checkpoint and takes over the primary role. Normal processing is then resumed in step 916 starting at the last checkpointed state and the process ends in step 918.

3) Local Checkpointing Using Write-Buffered Checkpointing

The write-buffered checkpointing procedure used for remote checkpointing can also be used for local checkpointing, with a shadow memory maintained within the same computer. The resulting computer is somewhat more robust to permanent faults, e.g., the permanent loss of some or all of primary memory. Although achieving maximum robustness requires copying modified pages first to a local buffer and then to shadow, the resulting increase in robustness, in the case of local checkpointing, does not generally justify the added performance degradation due to the double copying. Consequently, the default when using write buffering for local checkpointing is to copy pages directly into shadow memory, recognizing that local checkpointing is vulnerable to some permanent faults in any event.

Figure 10:
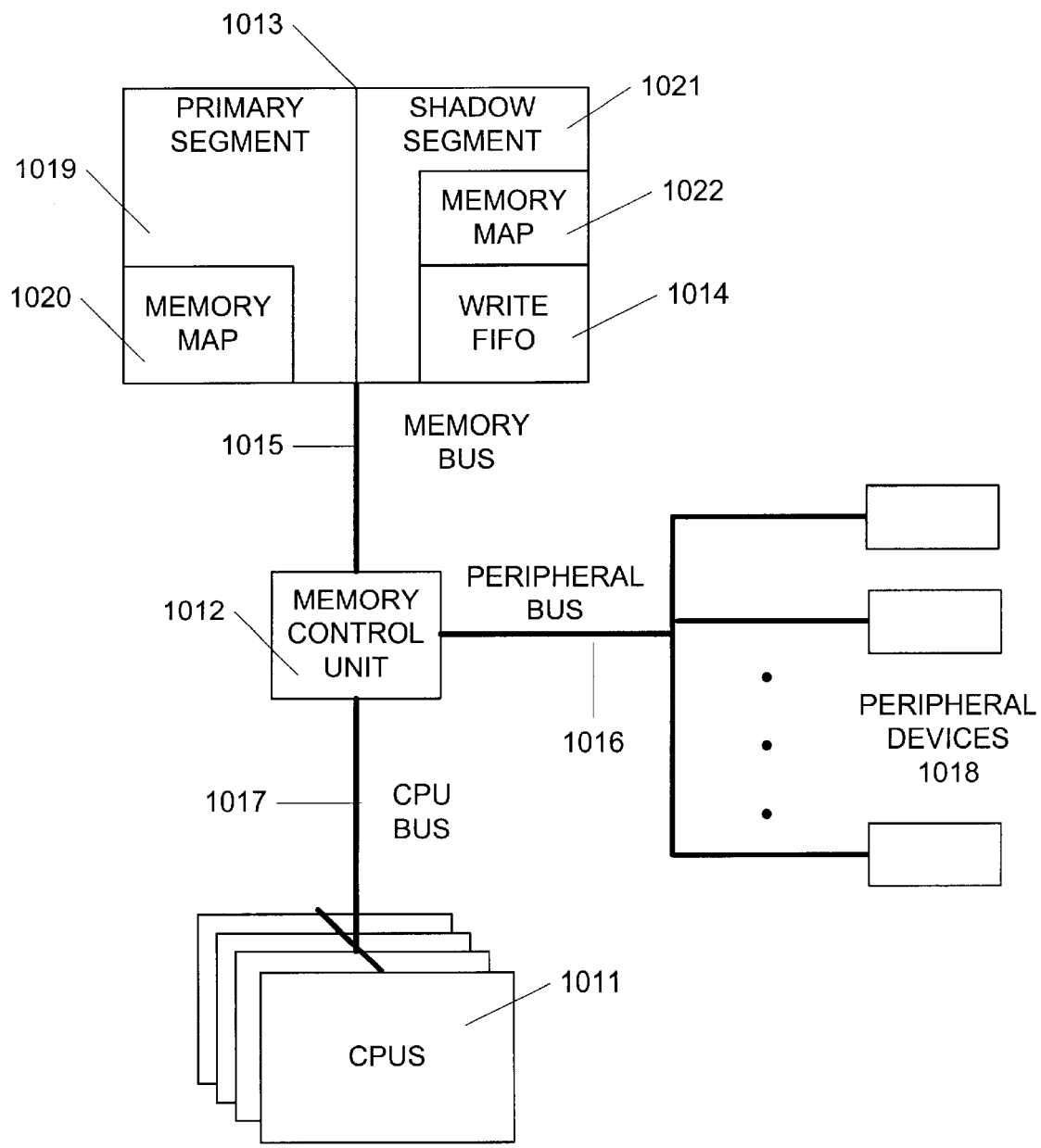
FIG. 10 is a block schematic diagram of a computer system which contains a write buffer used by the present invention is another embodiment of local checkpointing.

A block diagram of a local checkpointing computer based on write buffering is shown in FIG. 10. The basic computer system is identical to that shown in FIG. 1 and similar elements are given similar numeric designations. For example, CPUs 111 in FIG. 1 are equivalent to CPUs 1011 in FIG. 10. The difference between the systems is that main memory 113 in FIG. 1 is partitioned into primary memory segment 1019 and shadow memory segment 1021 of main memory 1013 in FIG. 10. The shadow segment 1021 also contains a shadow copy 1022 of the memory map 1020.

Following a checkpoint, the modified pages are copied from primary memory segment 1019 to shadow memory segment 1021 in a manner exactly analogous to the copying of modified pages from the primary computer memory 602 to the secondary computer memory 618 in the case of remote checkpointing discussed above.

As noted above with respect to remote checkpointing, the write FIFO buffer 1014 can be omitted at the cost of some robustness. If a fault occurs that interrupts the data transfer from primary memory segment 1019 to the shadow memory segment 1021 while establishing a checkpoint and if that transfer can't be resumed following the fault, both the primary memory segment 1019 and the shadow memory segment 1021 are left in an inconsistent state and recovery is generally not possible without a loss of data. This could happen, for example, if the primary memory segment 1019 suffered a fault that made some data unreadable. If the buffer 1014 is used and the shadow memory segment 1021 is able to take over the role of the primary memory segment 1019, lossless recovery would be possible under those same circumstances. The penalty of having a separate buffer 1014 is that the modified data has to be moved across the memory bus 1015 twice during each checkpoint, first from primary memory segment 1019 to the buffer 1014 and then from the buffer 1014 to the shadow memory segment 1021.

4) Remote Checkpointing in a Clustered Environment

Figure 11:
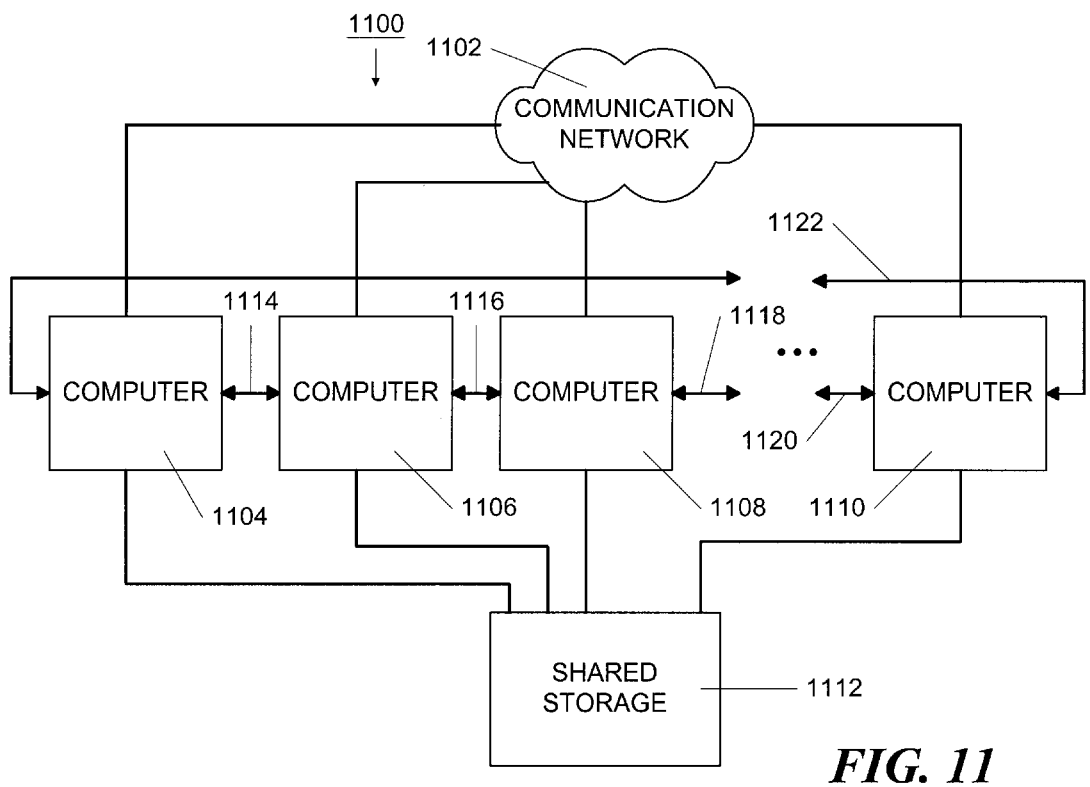
FIG. 11 is a block schematic diagram of a shared disk clustered computer system which is another checkpointing embodiment.

The remote checkpointing configuration can also be extended to include more than one computer as shown in FIG. 11. The system 1100 is comprised of a plurality of computers 1104–1110. Each of computers 1104–1110 has both a primary memory segment and a shadow memory segment, similar to the computer system as shown in FIG. 10. Each computer is connected to both of its immediate neighbors through one or more communication links 1114–1122 as described earlier for remote checkpointing between two computers. In this case, all but one of the computers are executing user applications; one is designated a standby. Each computer (other than the standby) sends checkpoint data to its neighbor on the right and each stores in its shadow memory checkpoint data received from its neighbor on the left. All computers share a common external storage device 1112 and all communicate through a common communication network 1102.

The fault detection and recovery procedure is identical to that described earlier for remote checkpointing between two computers. Here, however, after the computer to the right of the failed computer takes over the workload of that computer, the computer to its right takes over the tasks that it was executing prior to the fault, etc., with each computer between the failed computer and the standby taking over the tasks formerly being executed by the computer on its left. Since the standby was not executing user tasks, the computer to its right continues to execute the tasks it was previously executing, with the result that all user tasks continue to be executed with no loss of data or program continuity. When the failed computer is repaired and reintroduced into the system, or, following diagnosis is determined to have suffered a transient event, it enters into a synchronization phase with its neighbor to the left and takes over the role as standby.

Figure 12:
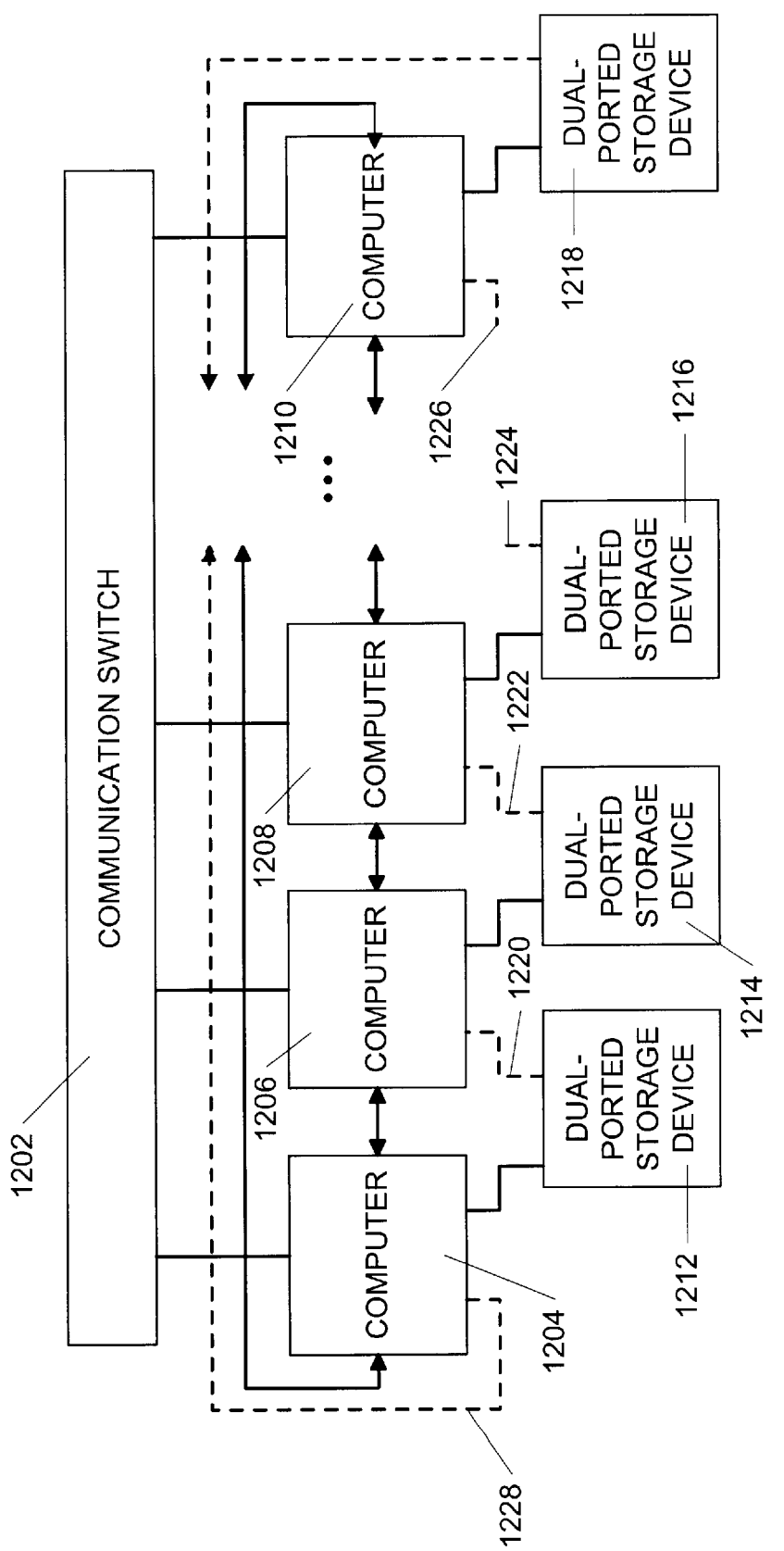
FIG. 12 is a block schematic diagram of a shared nothing clustered computer system which is yet another checkpointing embodiment.
Figure 13:
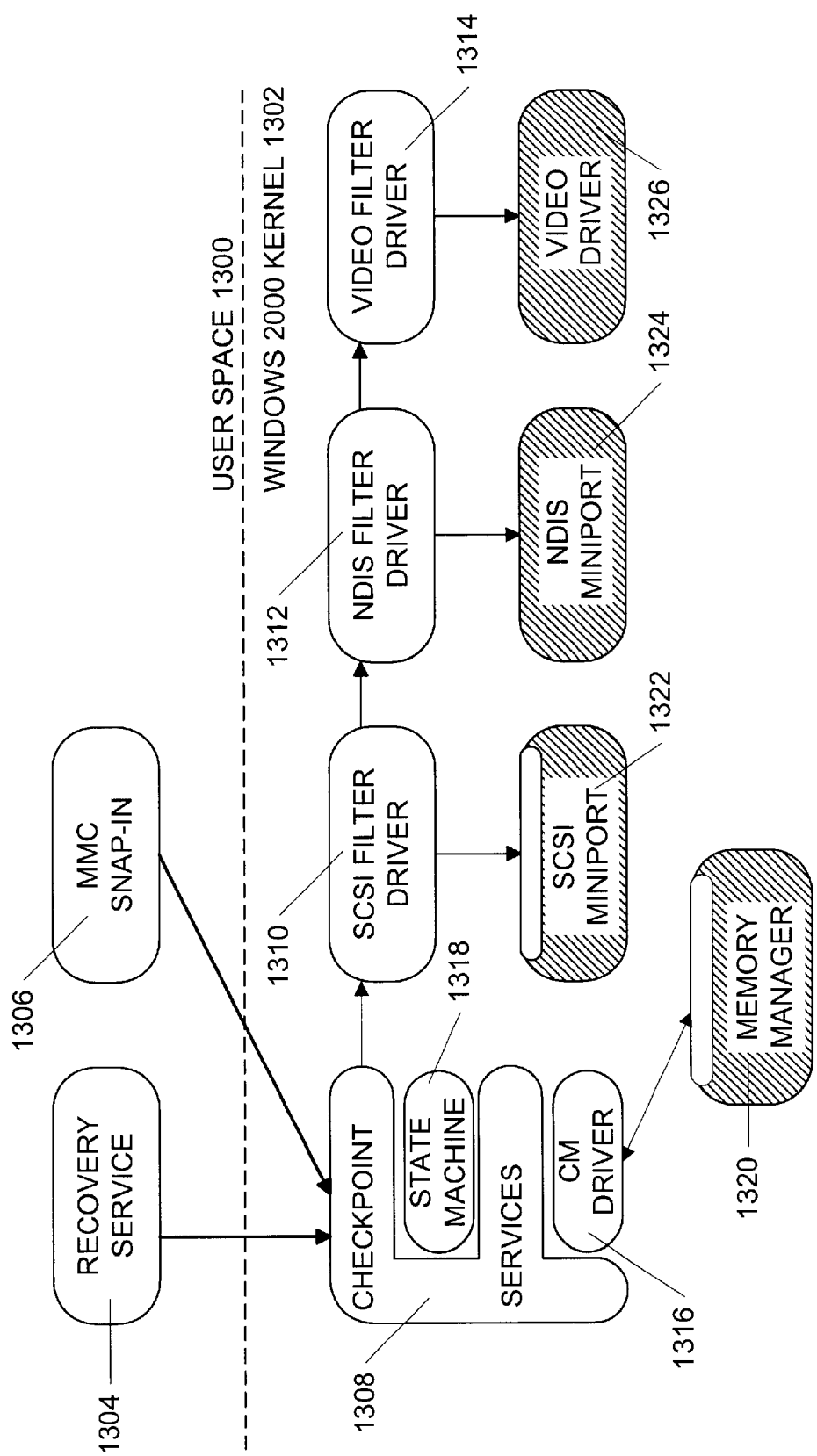
FIG. 13 is a block schematic diagram of software modules used to implement the inventive checkpointing systems.

The cluster shown in FIG. 11 is generally referred to as a "shared-disk" cluster since all computers share the same external storage device 1112 or other devices. FIG. 12 illustrates a "shared-nothing" cluster 1200, in which each computer 1204–1210 maintains its own storage subsystem 1212–1218, respectively. A shared-nothing cluster 1200 can also be configured for remote checkpointing by allowing each storage subsystem 1212–1218 to be dual-ported to two neighboring computers as shown by the dashed lines 1220–1228. The computer connected to each storage devices by the solid line is its initial "owner" and governs all accesses to it. Following a fault, the ownership of the storage devices passes to the computer connected to it through the dashed line path in each case in which its prior owner passes its workload to the computer to its right, thereby allowing the stored data to migrate along with the tasks being executed by a given computer. FIG. 12 also shows a communication switch 1202 that allows users to be redirected to the appropriate computer following a fault rather than the communication network 1102 shown in FIG. 11. Hybrid combinations of the configurations of FIGS. 11 and 12 are also possible and would be apparent to those skilled in the art., The software needed to implement the local and remote checkpointing and recovery procedures disclosed in the preceding paragraphs can be organized in any number of ways and can be tailored to any operating system. One embodiment, designed for the Windows 2000™ operating system, is structured as shown in FIG. 13. As shown, some of the checkpoint and recovery software runs in user space 1300 and some in the operating system kernel 1302. The shaded blocks 1320–1326 denote software that is already part of the standard kernel 1302. These include the memory manager 1320, the SCSI miniport 1322, the NDIS miniport 1324 and the video driver 1326. The following paragraphs describe the function of each of the software components shown in FIG. 13:

The checkpoint services library 1308 provides the major support routines for the other components. The major areas of support include, but are not limited to checkpoint handling, memory synchronization, I/O synchronization, user space interfaces, checkpoint memory driver support and filter driver support.

The checkpoint handling software 1308 manages all checkpointing operations for the system. These include saving the processor state and calling a registered checkpoint routine in the checkpoint memory driver 1316. The checkpoint handling software also handles performance monitoring and write intervention when modified pages are copied to the aforementioned shadow memory segment in background mode in write-buffered systems.

Memory synchronization is needed in write-buffered checkpointing computers to initialize the shadow memory segment and to recover from write FIFO overflows. This software also periodically reads the shadow memory segment in background mode in order to detect any bit errors that might otherwise escape detection.

The I/O synchronization software supports I/O synchronization and recovery managed by the filter drivers 1310–1314 (or a driver library for those operating systems that do not support filter drivers) and modified device drivers. This support includes exporting routines to register filter drivers 1310–1314, to enqueue I/O requests, to release those requests following a checkpoint, and to call the recovery software.

The user space interface software creates the device objects to provide the interfaces between the kernel code 1302 and the user-space 1300 support. This software also handles the I/O commands that interface with the recovery service 1304 and the MMC snap-in 1306 (described below).

The checkpoint memory driver support software is a class driver for the checkpoint memory driver 1316. The checkpoint memory driver support software includes code to regularize calls to the checkpoint memory driver 1316. The filter driver support software consists of a large block of code that is not device-specific and is therefore common to many filter drivers 1310–1314.

The checkpoint state machine 1318 provides the overall control of the checkpoint and recovery software. The state machine's states and state-transition rules differ somewhat for the different implementations described above, but all contain the following operational states:

Startup. The checkpointing software is initialized in this state. Initialization includes identifying the device drivers needed for recovery, setting up control of the checkpoint memory (CMM) driver 1316 and creating the initial checkpoint. Additionally, in configurations involving more than one computer, determination as to the mode (primary, standby-active, standby-passive) in which its associated computer is operating and the implementation of memory synchronization are both accomplished in this state.

Checkpointing. The state machine operates in this state during normal computer operations. It determines when a checkpoint is needed and calls the CMM driver 1316 to effect it. It also invokes the checkpoint services library 1308 to control I/O synchronization.

Standby. This state is operational only for remote checkpointing configurations and runs when its associated computer is in standby mode. It monitors checkpoints and updates main memory from the write FIFO. In the case of non-shared storage, the machine in this operational state implements the mirroring of data to its associated disks.

Recovery. The state machine enters this state upon the detection of a fault. In this state, it first creates a consistent image of main memory using the techniques appropriate to the configuration, as described above. It then restores the processor state that was in effect at the time of the last completed checkpoint and invokes the recovery programs for each I/O device. Finally, it invokes the recovery service 1304 and transitions to the startup or checkpointing state, depending again on the specific computer configuration.

The checkpoint memory driver (CMM driver) 1316 controls the interface to the shadow memory segment (if any) and to the read or write buffer (LIFO or FIFO). It provides the interface to the operating system's memory manager 1320, informing the memory manager 1320 when to set pages to the read-only state and when to return them to the read/write state. Changes to the memory manager 1320, along with the driver modifications discussed below, constitutes the only perturbation to an otherwise entirely standard operating system kernel needed to support the present invention. The memory manager 1320 must be modified to enable all pages (excluding the upper layers of the page tables) to be marked as "temporarily read-only" following a checkpoint while still maintaining the distinction between those pages and the pages that are truly read-only.

The recovery service 1304 is used to restore the operating environment, as seen by clients using directly attached video displays, that existed prior to the fault in question. Other recovery actions that are easier to perform in user mode than kernel mode are also handled by this service, e.g., adjusting the clock forward to handle rollback and recovery time losses, and, in the case of remote checkpointing, synchronizing the system clocks.

The MMC snap-in module 1306 module implements an interface for specifying checkpointing parameters such as the checkpoint interval and related parameters, the LIFO or FIFO buffer sizes, etc.

The filter drivers 1310–1314 are device-specific drivers that are used to capture device state information needed to restore the specific devices following recovery to the state they were in at the time of the last completed checkpoint. As indicated in FIG. 13, changes to some device drivers are needed to aid in capturing this information and restoring driver state. For example, a driver that downloads microcode to the controller will not automatically initialize the controller on a remote system during recovery without being modified to do so. The following paragraphs describe the driver modifications needed for several different classes of drivers. It is not meant to be exhaustive. Other classes of drivers can also be modified along the same general principles to support checkpointing and recovery.

Figure 14:
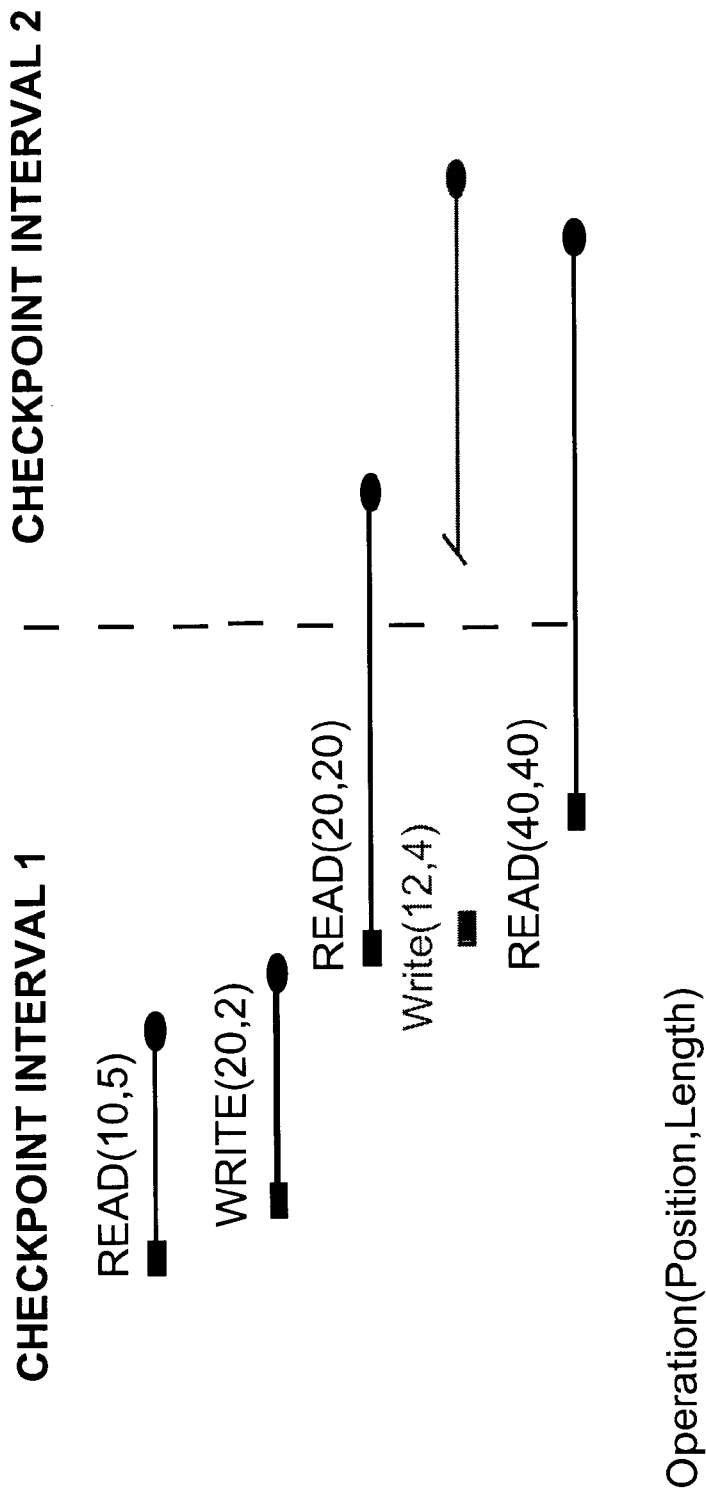
FIG. 14 is a schematic diagram showing starts and finishes of sample storage system operations in a checkpointed system in accordance with the principles of the present invention.

Storage device driver modifications are required to coordinate I/O operations with checkpoints. A schematic diagram of sample storage device operations is illustrated in FIG. 14. The checkpointing software maintains a list of all disk blocks that have been read from disk since the last checkpoint. This list is then scanned before any disk write command is allowed to be issued. If the block to be written is on the list, then, as shown in FIG. 14 for the write to location (12,4), the write command is not released until the next checkpoint is committed. Similarly, paged memory writes to disk are blocked for reasons previously mentioned. In the vast majority of cases, the block has not been read since the last checkpoint, it is allowed to proceed immediately.

The disk filter driver manages these operations for all disks, floppies, and disk-like media such as magneto-optical devices, and read-only and read/write compact disks. Upon recovery following a fault, all writes that were pending at the last completed checkpoint are re-released. The driver also supports the following additional operations:

I/O synchronization for dual-ported devices

For removable media, verification that the correct media are present on recovery. If a media device is inconsistent with that expected, the driver simulates an ejection, and, if the correct device is present, an insertion.

For WORM devices, a settable policy for recovery by either failing the media or failing the block in progress.

Call through to the associated storage bus driver (see below) to initiate recovery support.

Storage bus drivers must also support checkpointing and recovery. In the case of dual-ported SCSI buses, for example, the SCSI bus filter driver 1310 consists of a quick bus reset, thereby allowing the secondary computer to take over in the event of a failure, and functionality needed to restart all outstanding I/O requests.

Network recovery depends upon higher-level protocols to support loss or request retransmission of messages. The protocol requirement also means that, upon recovery connection-based protocols will fail; nevertheless, the controller will be reset to an operational state and the connection can be re-established. Network recovery makes use of the standard NDIS filter driver 1312. This filter driver 1312 is able to handle recovery of most controllers without further modifications to the lower-level drivers. The filter driver forces a reset call to take place, thereby restoring the hardware to an operational state. Based on user selection, any packets that were active at the last as checkpoint may be retransmitted.

The video filter driver 1314 monitors the video mode in normal operation and, during recovery, resets such devices to the mode that was current at the last checkpoint. The recovery service 1304 then forces the screen to be redrawn. The keyboard filter driver records all keyboard requests and restores them during recovery. No special requirements are imposed on mouse drivers.

The serial-port filter driver (not shown) monitors all I/O control commands that adjust the settings for the serial port and, upon recovery, restores the settings that were in effect at the last checkpoint. On recovery the filter driver writes a port-specific block of data to each serial port. This data is used either to reset the attached device or, for remote connections, to activate a switch connected to the port. The driver then simulates an error condition so that higher-level protocols can continue the necessary recovery operations.

The parallel-port filter driver (not shown), like its serial-port counterpart; intercepts the I/O commands adjusting the settings for the parallel port and restores the appropriate settings during recovery. Following recovery, the driver writes port-specific blocks of data to be used as described above for serial devices.

Although several exemplary embodiments of the invention have been disclosed, it will be apparent to those skilled in the art that various changes and modifications can be made which will achieve some, or all, of the advantages of the invention without departing from the spirit and scope of the invention.

For example, it will be obvious to those reasonably skilled in the art that, although the description was directed to a particular computer system construction, that other designs could be used in the same manner as that described. Other aspects, such as the specific circuitry utilized to achieve a particular function, as well as other modifications to the inventive concept are intended to be covered by the appended claims

What is claimed is:

1. Apparatus for achieving system-directed checkpointing without specialized hardware assistance in a computer system having a paged main memory in which some pages are designated as read-only and some pages are designated as read/write, the apparatus comprising:

a checkpoint mechanism for creating a new checkpoint interval by marking all memory pages associated with scheduled tasks and designated as read/write, other than certain pages involved in page fault handling, as temporary-read-only so that the first attempt to write to a page following the initiation of the new checkpoint interval generates a page-fault interrupt;

a buffer memory;

an exception handler that, when the page causing the interrupt is a temporary-read-only page, responds to the page-fault interrupt by capturing information associated with the page and re-designating the page as read/write.

2. The apparatus of claim 1 wherein the buffer memory is a portion of main memory, the information captured is the pre-image of the page causing the interrupt and wherein that pre-image is copied to the buffer.

3. The apparatus of claim 2 further comprising a restoration mechanism that restores the main memory from the pre-images stored in the buffer memory following any fault.

4. The apparatus of claim 1 wherein the computer system comprises a central processing unit having a state and wherein the checkpoint mechanism comprises a state capture mechanism that saves the central processing unit state in the main memory at the end of each checkpoint interval and the restoration mechanism uses the stored central processing unit state corresponding to the last committed checkpoint to restore the central processing unit following any fault.

5. The apparatus of claim 1 wherein the exception handler responds to the page-fault interrupt by executing a predetermined process for handling page-fault interrupts when the page has been designated as read-only.

6. The apparatus of claim 1 wherein the computer system further comprises input-output drivers and wherein the input-output drivers are modified to capture any change of state in themselves and associated devices and the restoration mechanism uses captured state information to restore, following any fault, the input-output drivers and associated devices to the states that existed at the time of the last committed checkpoint.

7. The apparatus of claim 1 further comprising a shadow memory and wherein the information captured as a result of the page-fault interrupt is the address of the page causing the interrupt and wherein the exception handler comprises a mechanism that checks to determine if the page address is on a list of page addresses that were captured during the previous checkpoint interval and not yet copied to the buffer and if so, copies the pre-image of the addressed page to the buffer and removes the page address from the list and the exception handler places the captured address on the list of addresses to be copied to the buffer at the end of the current checkpoint interval; and the checkpoint mechanism is configured to store a post-image of all pages that are written during each checkpoint interval, and whose addresses are therefore on the aforementioned list, into the shadow memory either at the end of that interval or during the subsequent checkpoint interval.

8. The apparatus of claim 7 wherein the checkpoint mechanism is configured to store the post-images temporarily in the buffer memory and then copy the post-images from the buffer memory to the shadow memory so that the shadow memory can always be made to reflect the complete image of the computer state at the time of the last checkpoint for which all corresponding pages have been copied to the buffer.

9. The apparatus of claim 8 wherein the buffer memory is a portion of the shadow memory.

10. The apparatus of claim 7 further comprising a backup computer system and wherein the shadow memory is located in the backup computer system.

11. The apparatus of claim 10 in which the computer system comprises a cluster of computers wherein each computer serves as the backup computer for exactly one other computer in the cluster and has a shadow memory therein, in which each computer has exactly one backup computer, in which one computer is designated a spare computer and in which all computers in the cluster except the spare computer are available to run user application programs.

12. The apparatus of claim 11 in which a post image of each page modified since the immediately preceding checkpoint is copied to a shadow memory in a backup computer following each checkpoint.

13. The apparatus of claim 7 in which the shadow memory is located in the computer system.

14. The apparatus of claim 7 wherein the computer system comprises a central processing unit having a state and wherein the checkpoint mechanism comprises a state capture mechanism that saves the central processing unit state in the main memory at the checkpoint and the restoration mechanism uses the stored central processing unit state to restore the central processing unit following any fault.

15. The apparatus of claim 7 wherein the exception handler responds to the page-fault interrupt by executing a predetermined process for handling page-fault interrupts when the page has been designated as read-only.

16. The apparatus of claim 7 wherein the computer system further comprises input-output drivers and wherein the input-output drivers are modified to capture any change of state in themselves and associated devices and the restoration mechanism uses state information that prevailed at the time of the last completed checkpoint to restore the input-output drivers and associated devices following any fault.

17. The apparatus of claim 1 wherein the computer system further comprises disk storage devices that read and write information in sector blocks and wherein the apparatus further comprises a mechanism for maintaining a list of all disk sectors that have been read since the most recent checkpoint was created and wherein the input-output drivers scan the list before executing a write operation to the disk storage.

18. The apparatus of claim 17 wherein the input-output drivers place the write operation on a queue for execution when a next checkpoint is created when the write operation consists of a region that includes sectors on the list and execute the write operation immediately when the write operation consists of a region that does not include sectors on the list and is not a paged-memory write.

19. The apparatus of claim 1 wherein the computer system has a memory map that indicates the location of pages in the paged main memory and the exception handler checks the memory map before writing a page to the memory.

20. The apparatus of claim 19 wherein the memory map is hierarchical and has a top and a bottom and the redesignation of the page as read/write is carried out from the top of the memory map hierarchy, level-by-level to the bottom of the memory map hierarchy in such a way that only the top level has to be copied to the buffer memory at the time that its associated program is scheduled in order to establish a consistent checkpoint and to avoid page-fault interrupts while other page-fault interrupts are being serviced.

21. A method for achieving system-directed checkpointing without specialized hardware assistance in a computer system having a paged main memory in which some pages are designated as read-only and some pages are designated as read/write and a buffer memory, the method comprising:

(a) initiating a new checkpoint interval by marking all memory pages designated as read/write, other than certain pages involved in page-fault handling, as temporary-read-only so that the first attempt to write a page following the checkpoint generates a page-fault interrupt;

(b) capturing, in response to each page-fault interrupt when the page has been designated as temporary-read-only, information pertaining to the page that caused the interrupt; and re-designating the page as read/write;

(c) capturing additional state information at the end of each checkpoint interval and then committing the checkpoint.

22. The method of claim 21 further comprising:

(d) restoring the main memory from pre-images stored in the buffer memory following any fault.

23. The method of claim 21 wherein the computer system comprises a central processing unit having a state and wherein step (c) comprises:

(c1) saving the central processing unit state in the main memory and step (d) comprises:

(d1) using the stored central processing unit state to restore the central processing unit following any fault.

24. The method of claim 21 wherein the computer system further comprises input-output drivers and wherein the method further comprises:

(e) modifying the input-output drivers to capture any change of state in themselves and associated devices and wherein step (c) comprises.
  (c2) saving the state of the input-output drivers and associated devices, and step (d) comprises
  (d2) using captured change of state information to restore, following any fault, the input-output drivers and associated devices to the states that prevailed at the last committed checkpoint, and restarting all appropriate input and output operations that were in process at the time of the last committed checkpoint.

25. The method of claim 21 wherein the computer system further comprises a shadow memory and wherein the information captured in step (b) comprises the address of the page causing the interrupt if that page had been designated temporary-read-only and step (c) comprises
  (c3) initiating a store of the post-image of all pages that are thus recorded during the just completed checkpoint interval to shadow memory.

26. The method of claim 25 wherein the computer system further comprises a buffer memory and wherein the storage operation initiated in step (c3) comprises storing the post-images temporarily in the buffer memory and then copying the post-images from the buffer memory to the appropriate locations in shadow memory so that the shadow memory can always reconstruct a complete and consistent image of the computer state at the time of the last checkpoint whose state has been entirely transferred to the buffer.

27. A computer program product for achieving system-directed checkpointing without specialized hardware assistance in a computer system having a paged main memory in which some pages are designated as read-only and some pages are designated as read/write and a buffer memory, the computer program product comprising a computer usable medium having computer readable program code thereon, including:
  program code for initiating a new checkpoint interval by marking all memory pages designated as read/write as temporary-read-only so that the first attempt to write a page following the checkpoint generates a page-fault interrupt;
  program code for capturing, in response to the page-fault interrupt, when the page has been designated as temporary-read-only, information pertaining to that page; and
  program code for re-designating the page as read/write.

28. The computer program product of claim 27 in which the information captured is the pre-image of the page and in which that pre-image is stored to the buffer and further comprising program code for restoring the main memory from pre-images stored in the buffer memory following any fault.

29. The computer program product of claim 27 in which the information captured is the address of the page and in which the post-image of the page is stored to the buffer following each checkpoint interval and further comprising program code for either restoring the main memory from post-images stored in the buffer memory following any fault or restoring the shadow memory and using the shadow memory as the new main memory.

30. The computer program product of claim 27 wherein the computer system comprises a central processing unit having a state and wherein the program code for creating a checkpoint comprises program code for saving the central processing unit state in the main memory at the end of each checkpoint interval and the program code for restoring the main memory comprises program code for using the stored central processing unit state to restore the central processing unit following any fault.

31. A computer data signal embodied in a carrier wave for achieving system-directed checkpointing without specialized hardware assistance in a computer system having a paged main memory in which some pages are designated as read-only and some pages are designated as read/write and a buffer memory, the computer data signal comprising:
  program code for initiating a new checkpoint by marking all memory pages designated as read/write as temporary-read-only so that the first attempt to write a page following the checkpoint generates a page-fault interrupt;
  program code for capturing, in response to the page-fault interrupt when the page has been designated as temporary-read-only, information pertaining to that page; and
  program code for re-designating the page as read/write.

* * * * *